(12) United States Patent
Morimura et al.

(10) Patent No.: US 10,579,933 B2
(45) Date of Patent: Mar. 3, 2020

(54) PROCESSING APPARATUS, PROCESSING METHOD, ESTIMATING APPARATUS, ESTIMATING METHOD, AND PROGRAM

(71) Applicant: International Business Machines Corporation, Armonk, NY (US)

(72) Inventors: Tetsuro Morimura, Tokyo (JP); Takayuki Osogami, Tokyo (JP); Makoto Otsuka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 948 days.

(21) Appl. No.: 14/974,467

(22) Filed: Dec. 18, 2015

(65) Prior Publication Data
US 2016/0180251 A1  Jun. 23, 2016

(30) Foreign Application Priority Data
Dec. 18, 2014 (JP) .................................. 2014-256104

(51) Int. Cl.
*G06N 7/00* (2006.01)
(52) U.S. Cl.
CPC .................................... *G06N 7/005* (2013.01)
(58) Field of Classification Search
CPC .............................. G06N 7/005; G06N 99/005
(Continued)

(56) References Cited

U.S. PATENT DOCUMENTS 6,430,539 B1   8/2002 Lazarus et al.
7,155,401 B1 * 12/2006 Cragun .................. G06Q 30/02
                                                    705/7.31
(Continued)

FOREIGN PATENT DOCUMENTS

JP          05346915        12/1993
JP         2009087235        4/2009
(Continued)

OTHER PUBLICATIONS

Osogami et al., "Restricted Boltzmann machines modeling human choice", NIPS 2014, Dec. 8, 2014. (Year: 2014).*
(Continued)

*Primary Examiner* — Dave Misir
(74) *Attorney, Agent, or Firm* — Fleit Intellectual Property Law; Thomas S. Grzesik

(57) ABSTRACT

A processing apparatus is disclosed for representing cognitively biased selection behavior of a consumer as a learnable model with high prediction accuracy taking into account even feature values of a product and the consumer. The processing apparatus generates a selection model obtained by modeling selection behavior of a selection entity that selects at least one choice out of presented input choices. The processing apparatus includes an acquiring unit to acquire training data including a plurality of input feature vectors that indicate features of a plurality of the choices presented to the selection entity and an output feature vector that indicates a feature of an output choice. The processing apparatus further includes an input combining unit to combine the plurality of input vectors to generate an input combined vector, and a learning processing unit to learn a selection model on the basis of the input combined vector and the output vector.

20 Claims, 18 Drawing Sheets

(58) Field of Classification Search
USPC .......................................................... 706/12
See application file for complete search history.

(56) References Cited

U.S. PATENT DOCUMENTS

| | | | | |
|---|---|---|---|---|
| 2005/0261953 | A1* | 11/2005 | Malek | G06Q 30/02 705/7.32 |
| 2007/0282666 | A1* | 12/2007 | Afeyan | G06F 17/50 706/13 |
| 2012/0078681 | A1* | 3/2012 | Rahman | G06Q 30/0201 705/7.29 |
| 2012/0259676 | A1* | 10/2012 | Wagner | G06Q 10/04 705/7.32 |
| 2013/0198007 | A1* | 8/2013 | Selinger | G06Q 30/02 705/14.66 |
| 2013/0332406 | A1 | 12/2013 | Gilliam et al. | |
| 2014/0136362 | A1* | 5/2014 | Shaya | G06Q 30/02 705/26.7 |
| 2015/0170029 | A1 | 6/2015 | Otsuka | |
| 2015/0170170 | A1 | 6/2015 | Osogami et al. | |
| 2015/0278156 | A1* | 10/2015 | Ambai | G06F 17/10 706/12 |
| 2015/0287056 | A1 | 10/2015 | Osogami et al. | |
| 2015/0287061 | A1 | 10/2015 | Otsuka | |
| 2016/0110794 | A1 | 4/2016 | Hsiao et al. | |
| 2016/0125271 | A1* | 5/2016 | Ambai | H03M 7/14 382/155 |

FOREIGN PATENT DOCUMENTS

| | | |
|---|---|---|
| JP | 2010026596 | 2/2010 |
| JP | 2010073189 | 4/2010 |

OTHER PUBLICATIONS

Osogami et al., "A hierarchical Bayesian choice model with visibility", 2014 22nd International Conference on Pattern Recognition, Aug. 24, 2014. (Year: 2014).*

Teppan, E., et al.,"Minimization of Product Utility Estimation Errors in Recommender Result Set Evaluations", Proceedings of the 2009 IEEE/WIC/ACM International Joint Conference on Web Intelligence and Intelligent Agent Technology, Sep. 15-18, 2009, pp. 1-8.

Salakhutdinov, R., et al. "Replicated Softmax: An Undirected Topic Model", Advances in Neural Information Processing Systems, Dec. 2009, pp. 1-8.

Roe, R.M., et al., "Multialternative Decision Field Theory: A Dynamic Connectionist Model of Decision Making", Psychological Review, Apr. 2001, pp. 1-24, vol. 108, No. 2.

Hruschka, H., "Analyzing Market Baskets by Restricted Boltzmann Machines", OR Spectrum, Aug. 9, 2012, pp. 1-20.

Shenoy, P., et al., "Rational Preference Shifts in Multi-Attribute Choice: What is Fair?", Proceedings of the 35th Annual Cognitive Society, Jul. 23-Aug. 3, 2013, pp. 1-6.

Marina Fujita et al., "Development of a Robust Choice Model for Demand Forecasting under Fluctuant Situations", The Institute of Electronics, Information and Communication Engineers Technical Report, The Institute of Electronics, Information and Communication Engineers, vol. 112, No. 466, pp. 59-64, Only English Abstract considered.

Takayuki Osogami et al., "Restricted Boltzmann machines modeling human choice", NIPS'14 Proceedings of the 27th International Conference on Neural Information Processing Systems—vol. 1, The Neural Information Processing System (NIPS) Foundation, pp. 73-81.

* cited by examiner

[Figure 1]
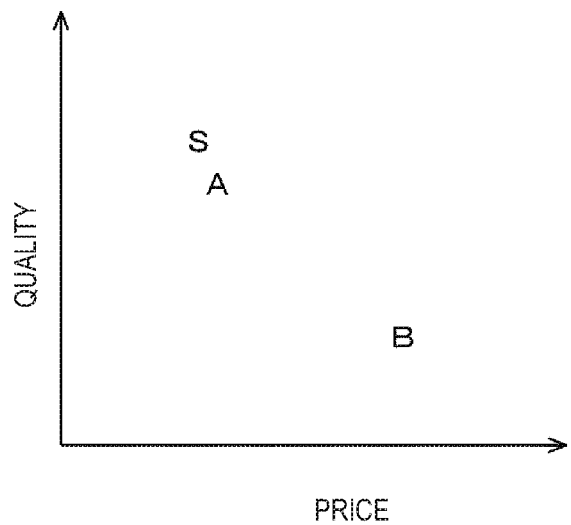
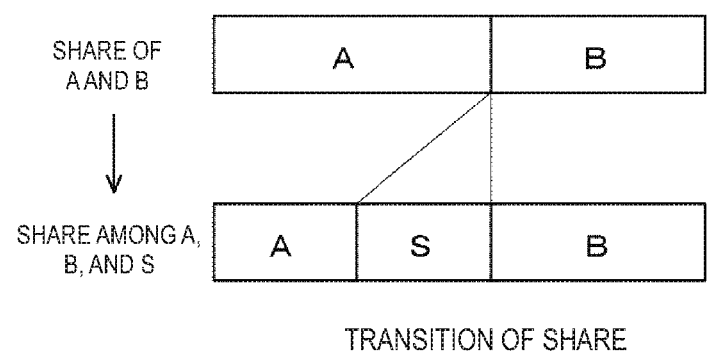
TRANSITION OF SHARE
SIMILARITY EFFECT

[Figure 2]
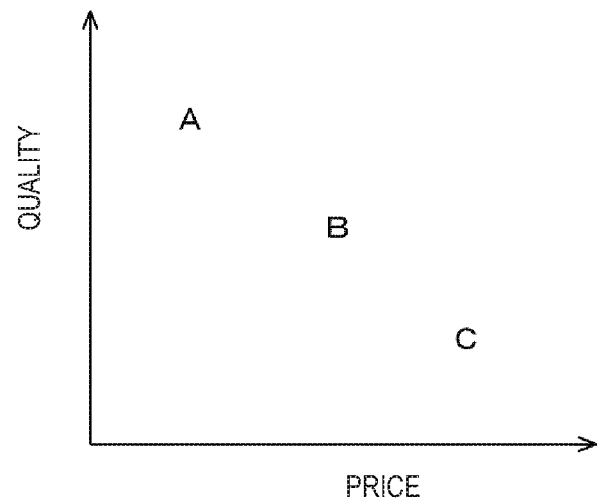
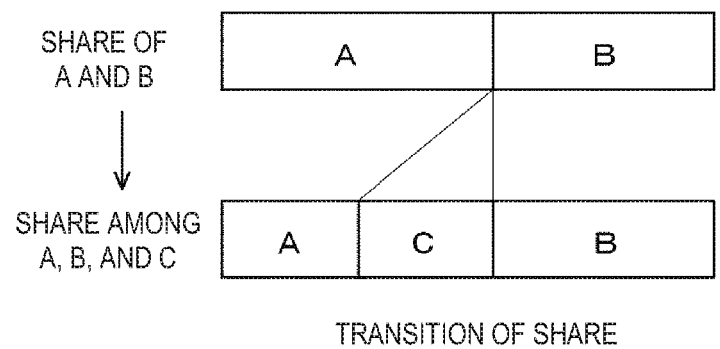
TRANSITION OF SHARE
COMPROMISE EFFECT

[Figure 3]
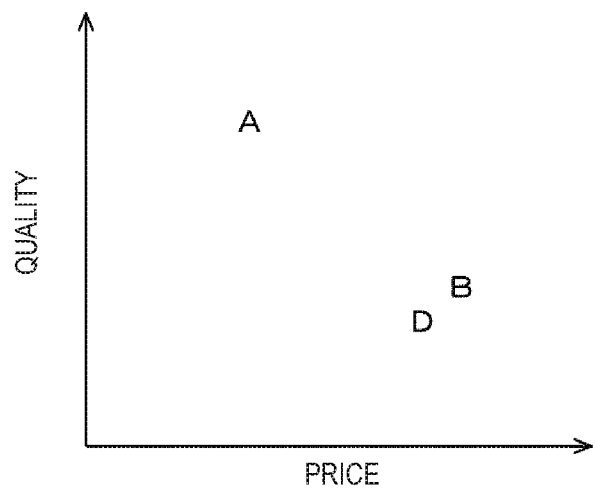
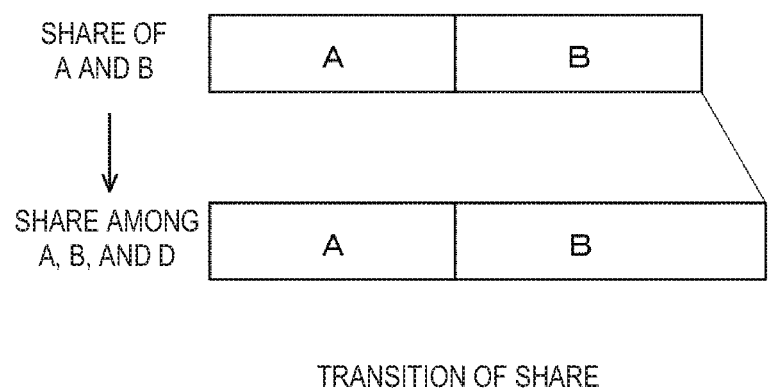
TRANSITION OF SHARE
ATTRACTION EFFECT

[Figure 4]
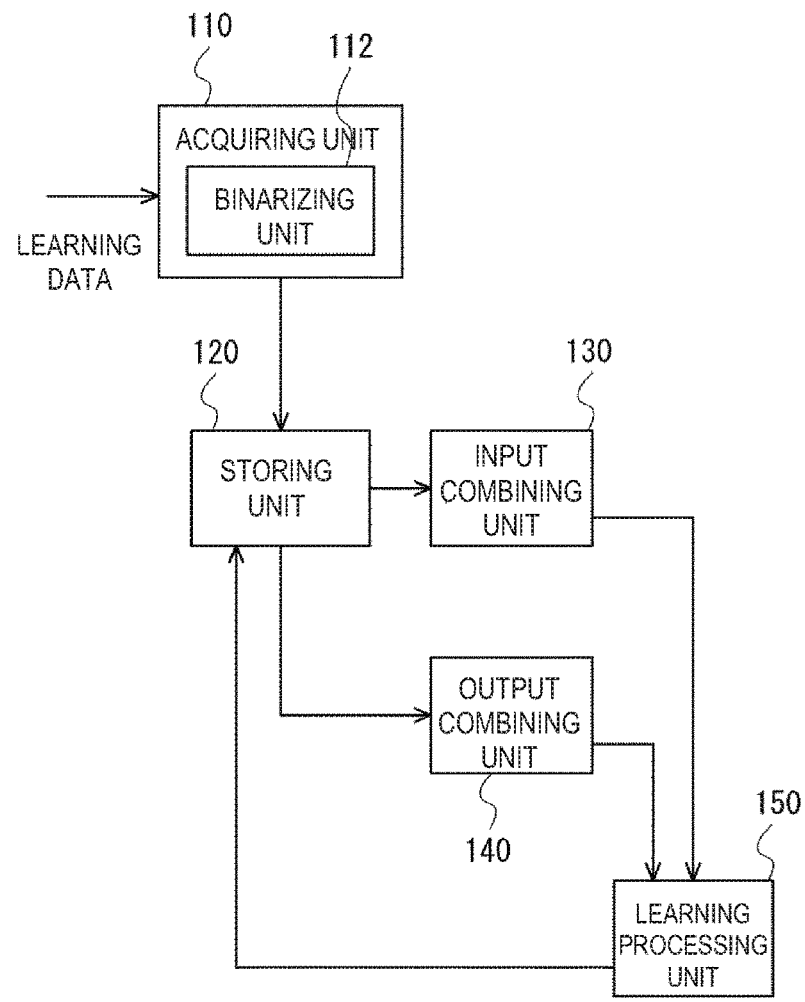

[Figure 5]
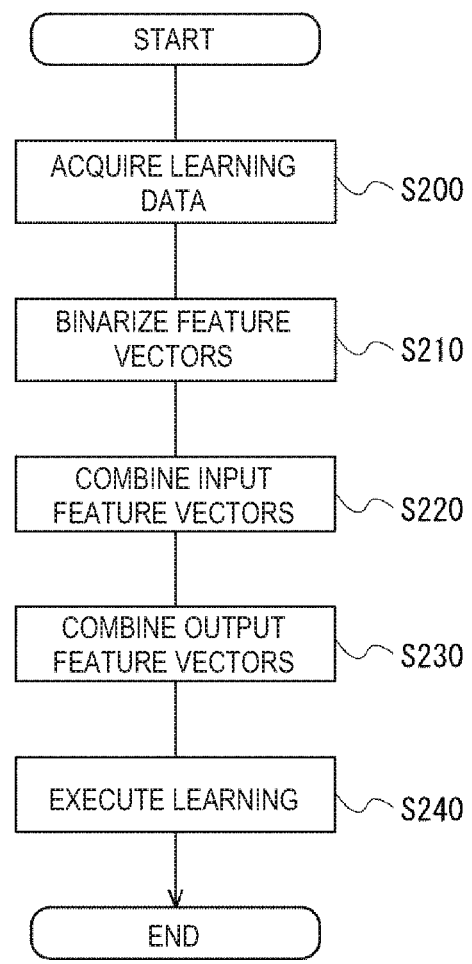

[Figure 6]
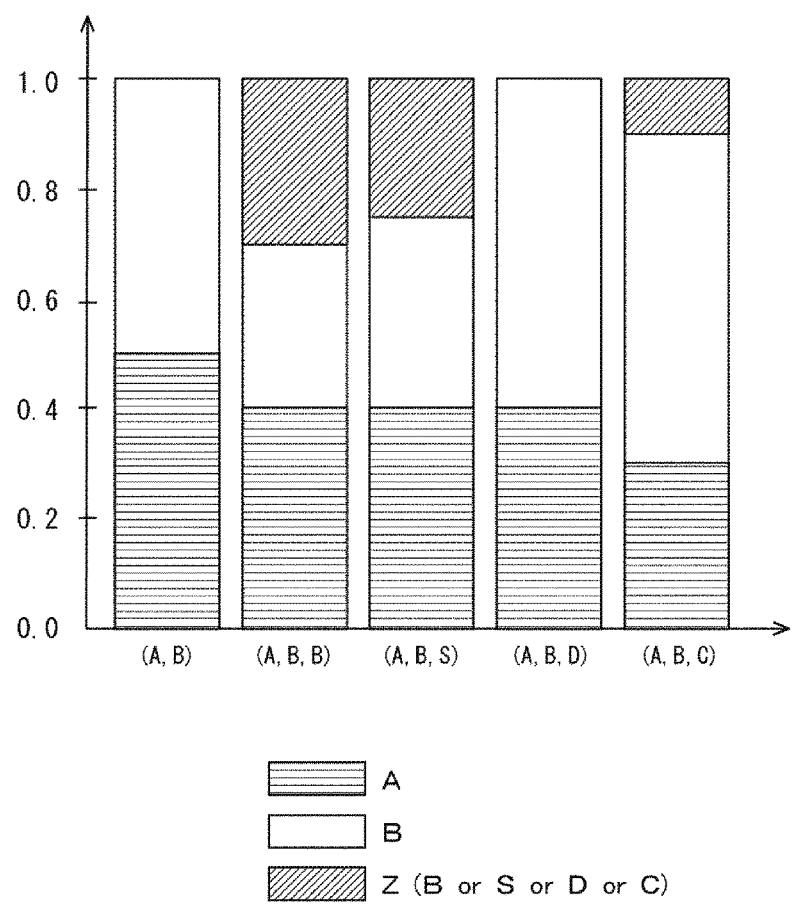

[Figure 7]
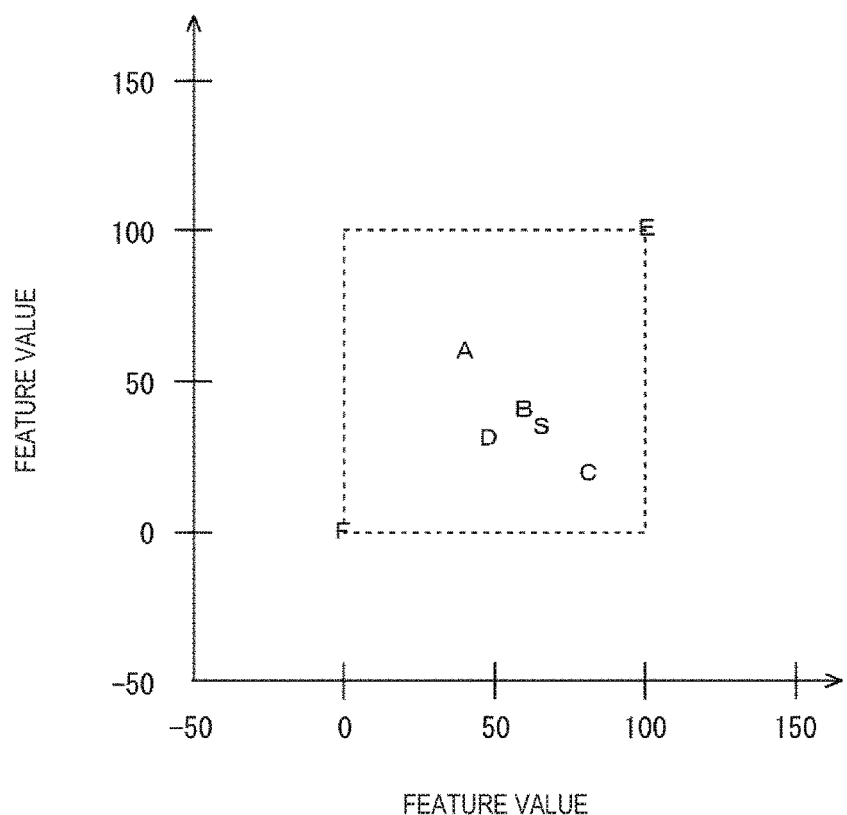

[Figure 8]
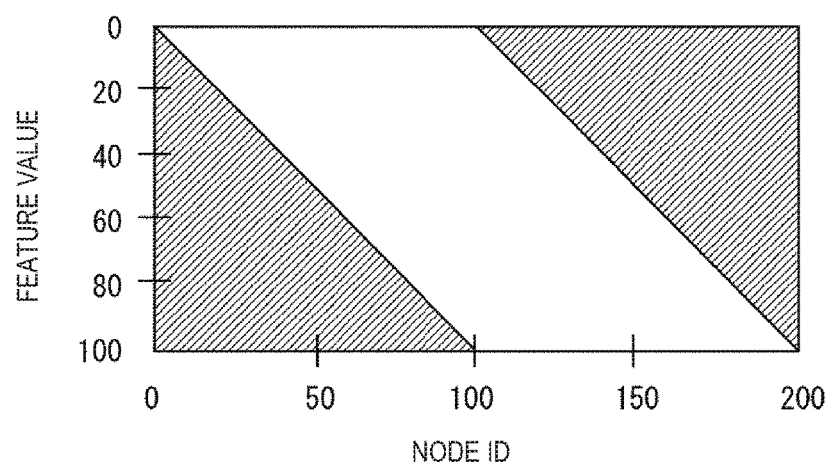

[Figure 9]
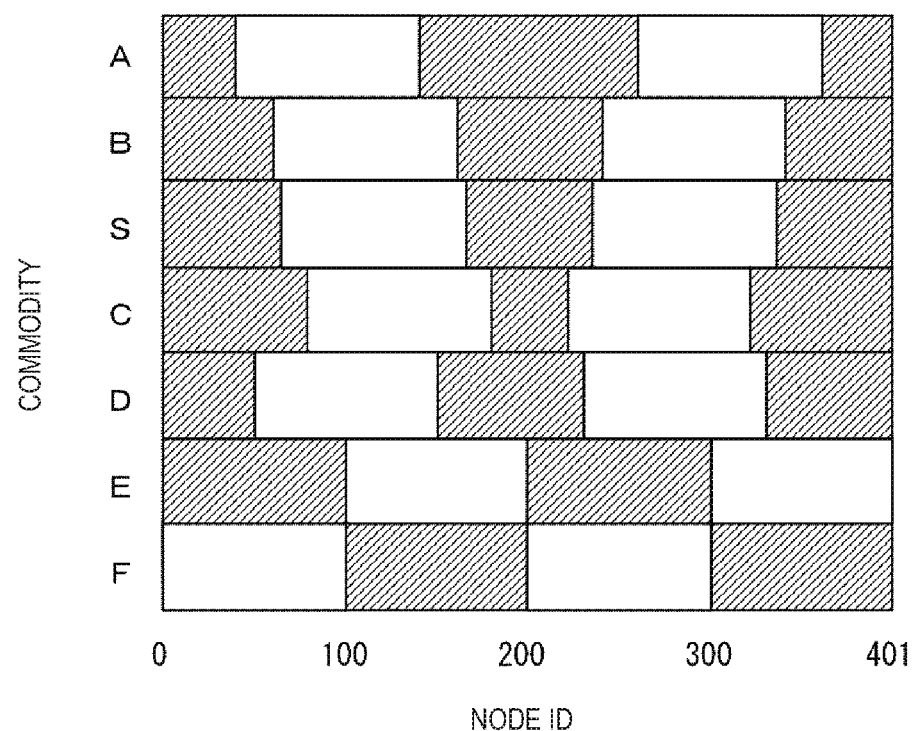

[Figure 10]
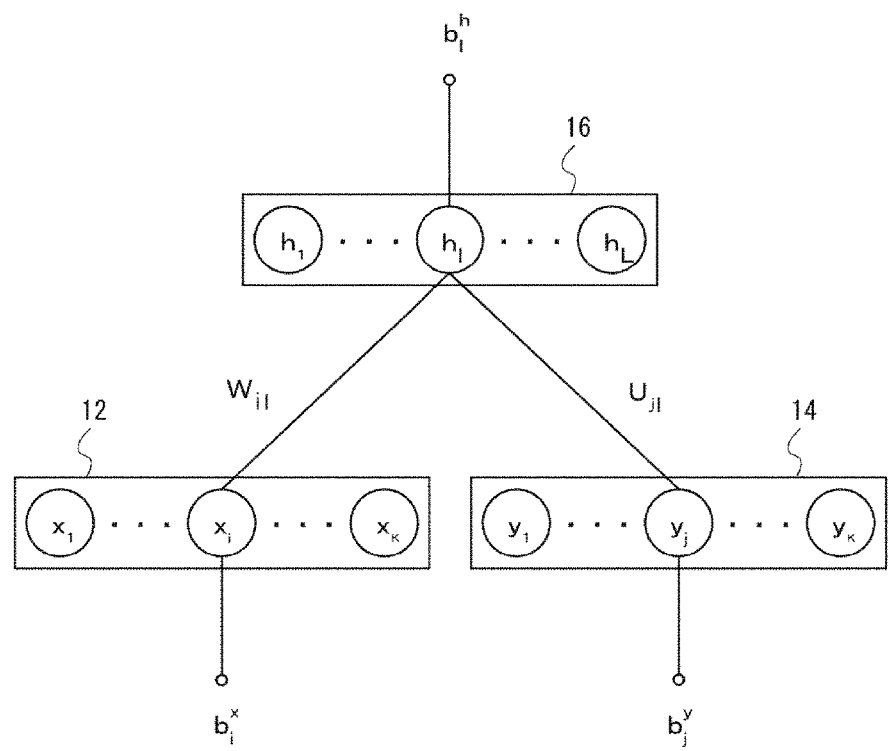

[Figure 11]
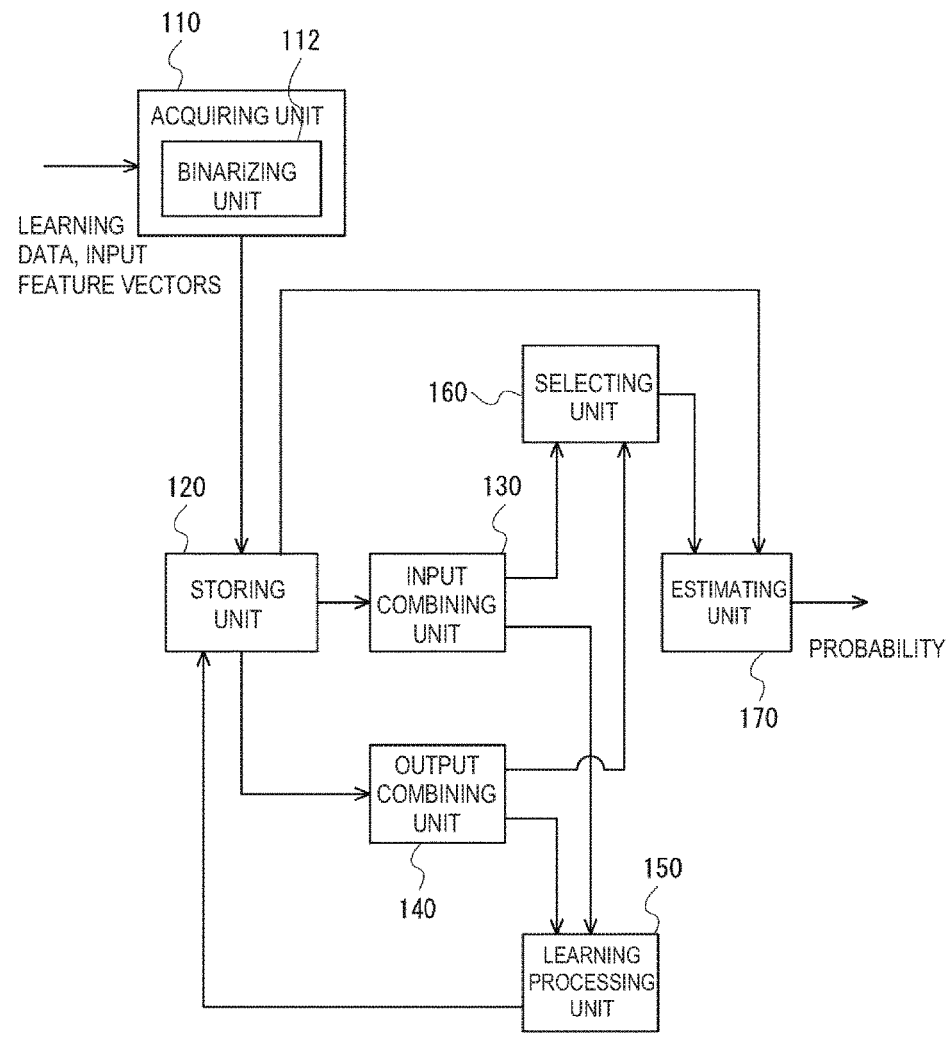

[Figure 12]
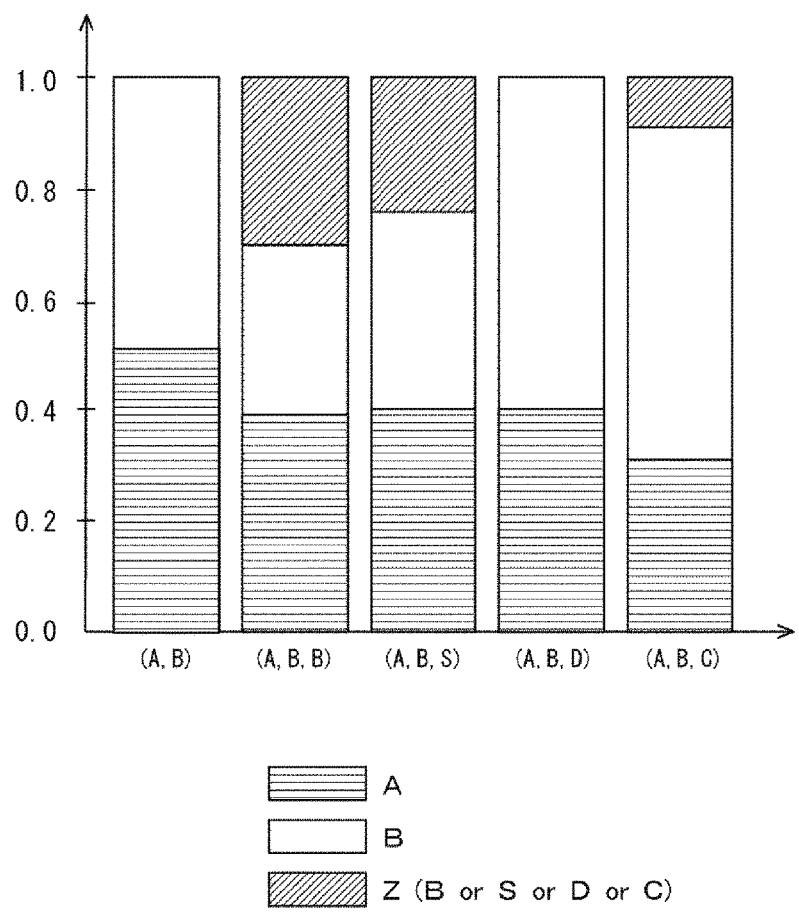

[Figure 13]
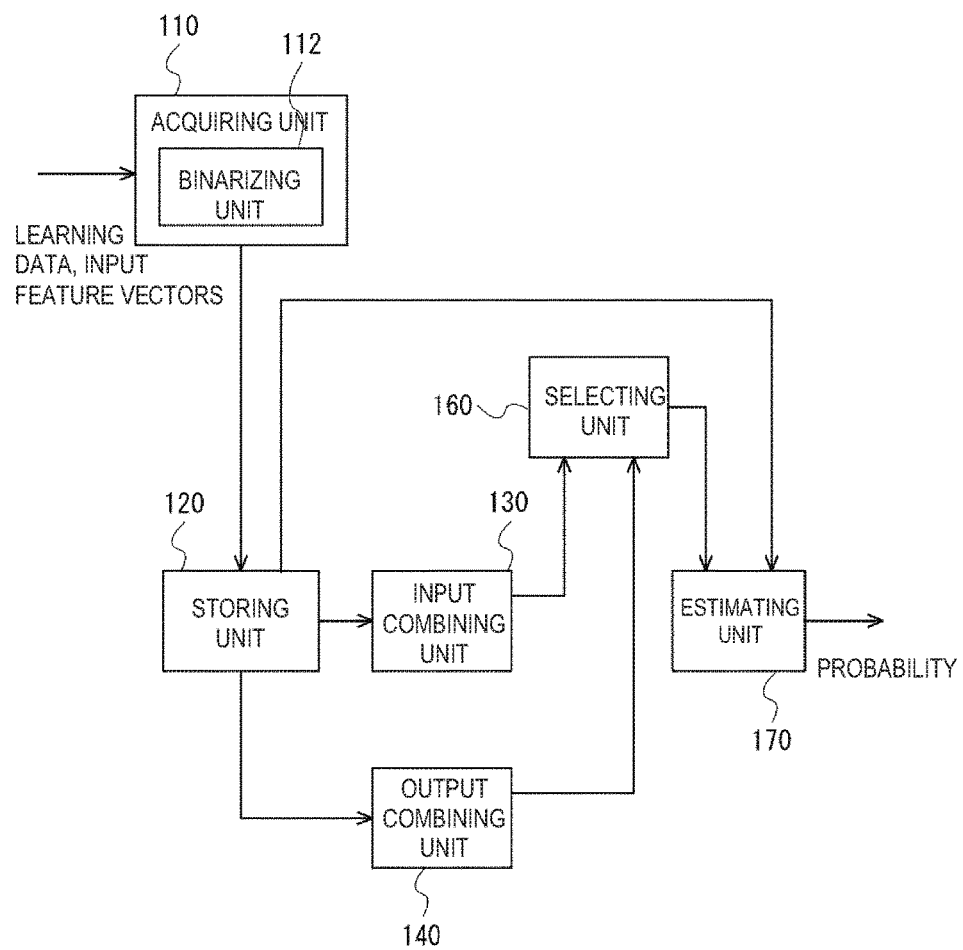

[Figure 14]
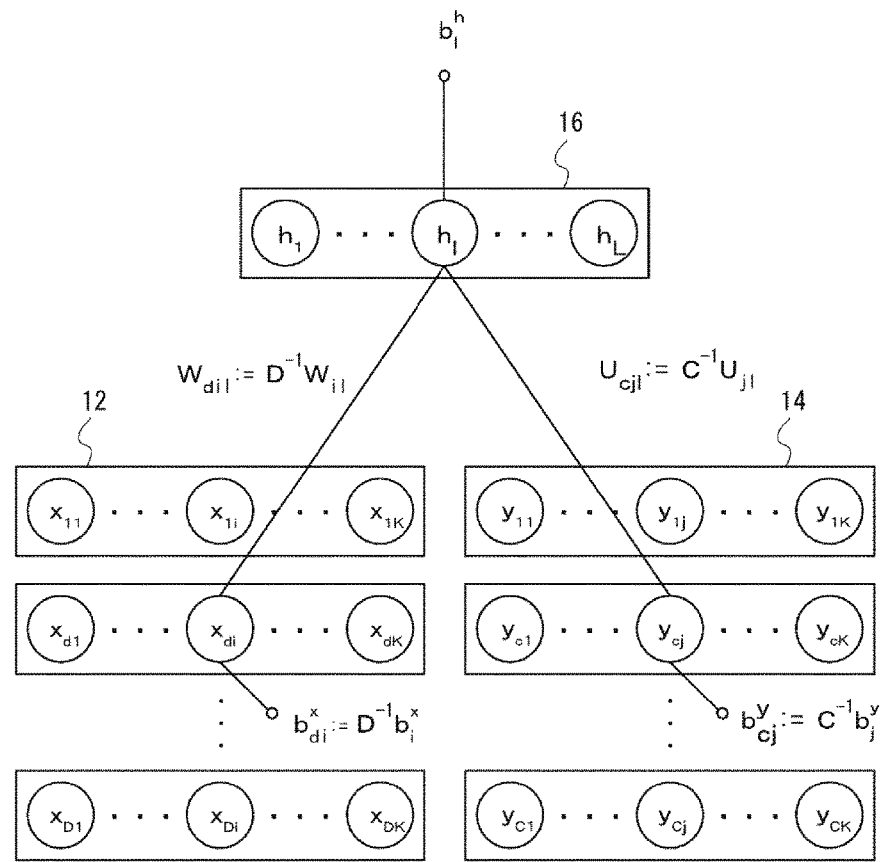

[Figure 15]
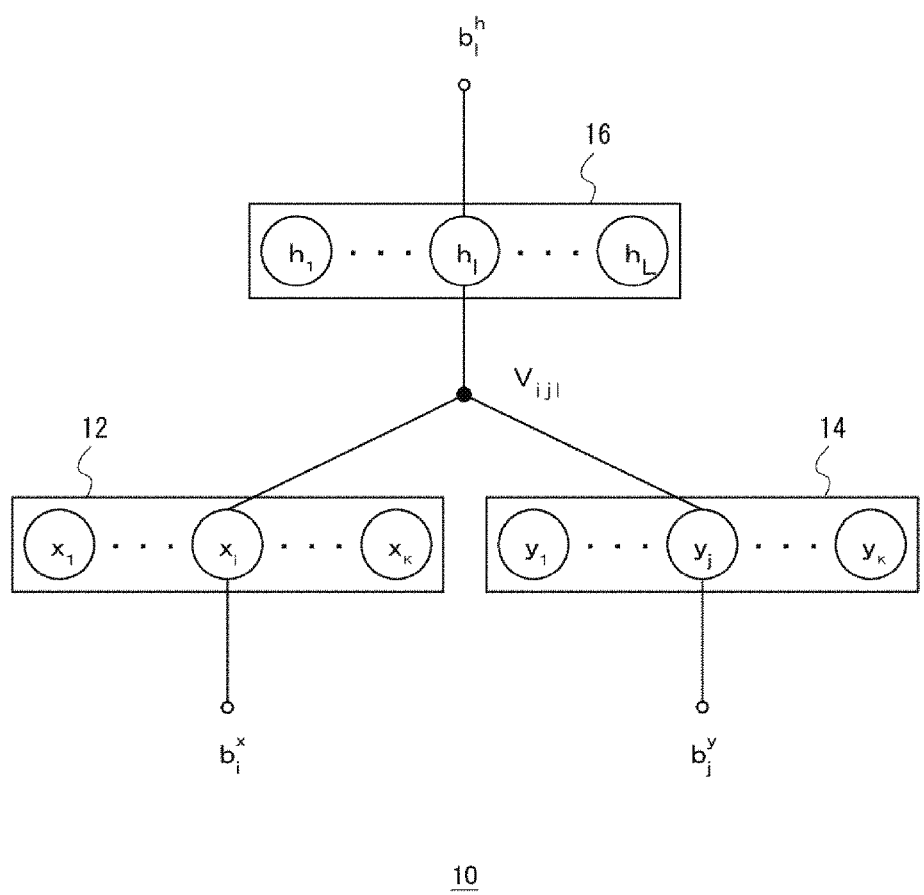

[Figure 16]
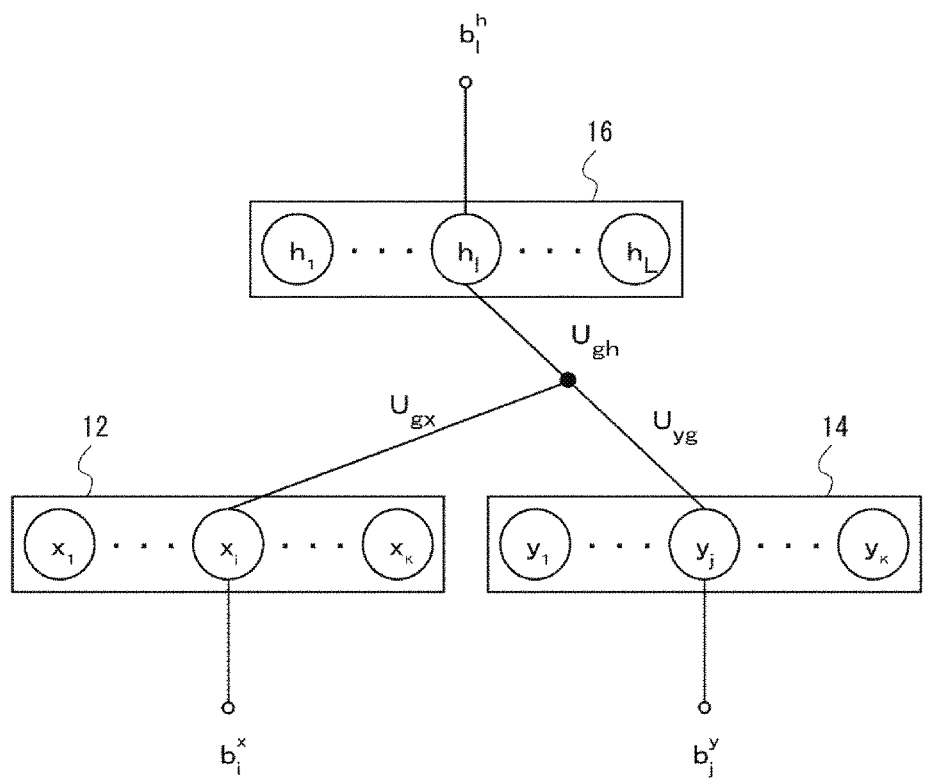

[Figure 17]
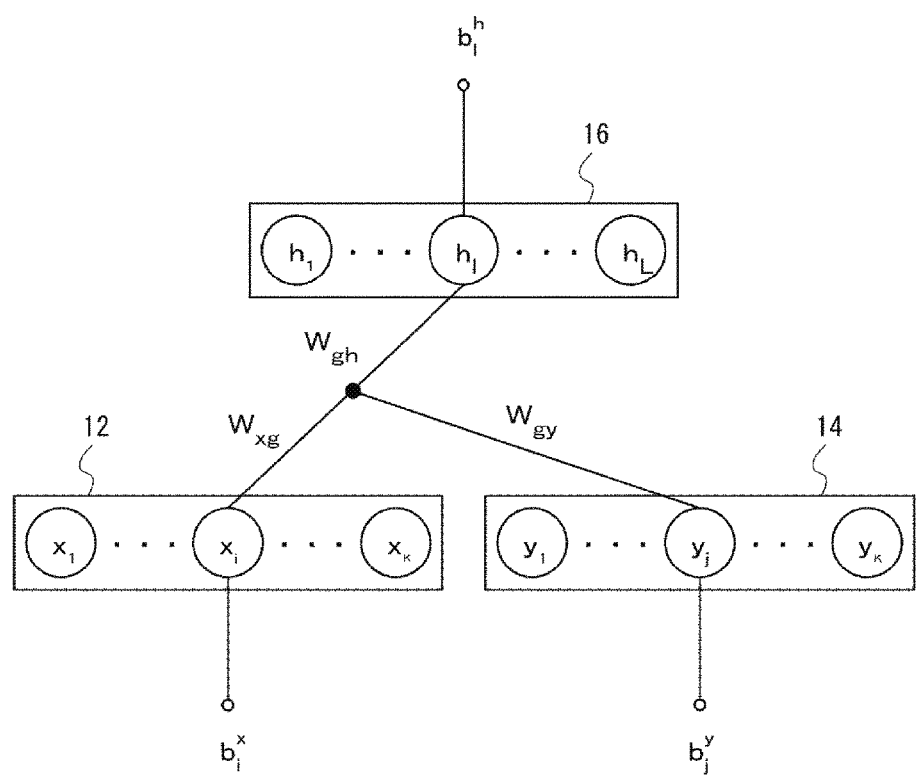

[Figure 18]
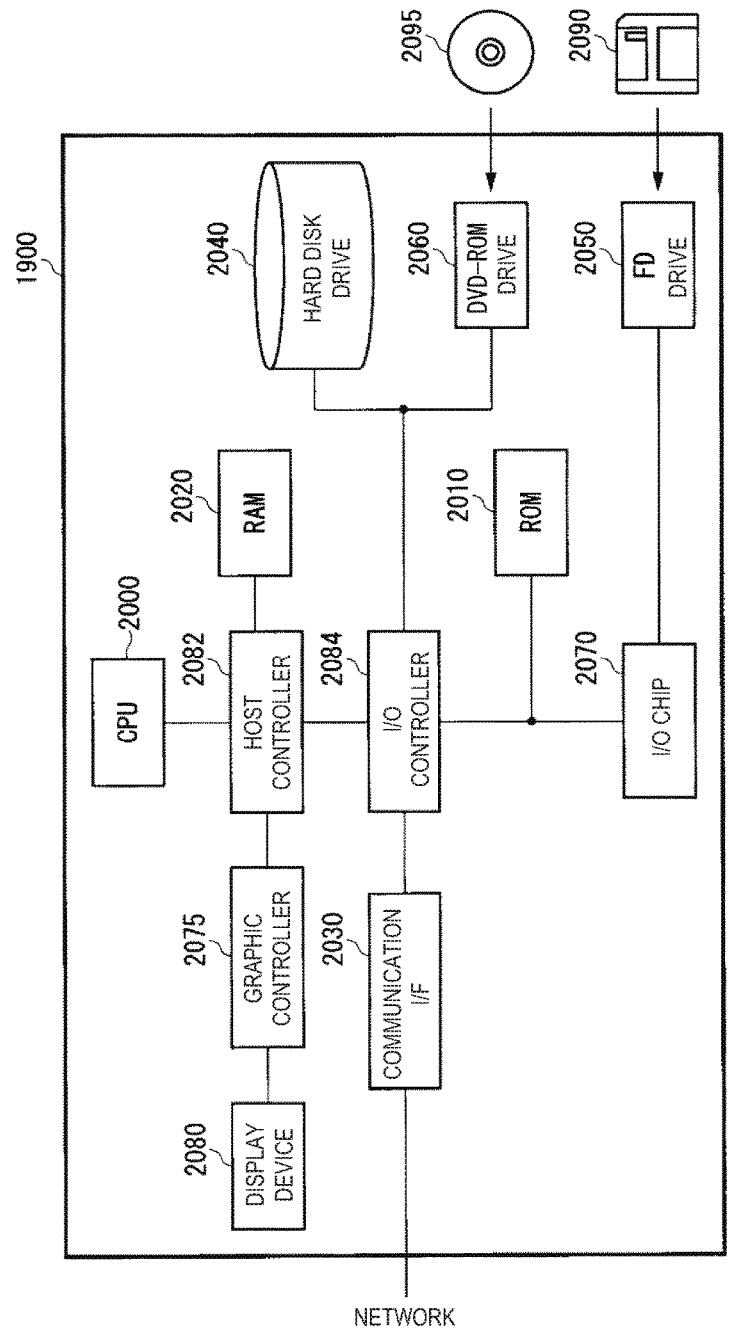

PROCESSING APPARATUS, PROCESSING METHOD, ESTIMATING APPARATUS, ESTIMATING METHOD, AND PROGRAM

CROSS-REFERENCE TO RELATED APPLICATION

This application is based upon and claims priority from prior Japanese patent application number 2014-256104, filed Dec. 18, 2014, the entire contents of which are hereby incorporated by reference herein.

TECHNICAL FIELD

The present invention relates to a processing apparatus, a processing method, an estimating apparatus, an estimating method, and a program.

BACKGROUND ART

There has been known a method of analyzing consumption behavior of consumers, a system for recommending products to consumers, and the like (see, for example, Non-Patent Literatures 1 to 3). It is known that, when a consumer selects one or a plurality of products out of a plurality of products, selection behavior of the consumer is variously cognitively biased. A related art thereof is known (see, for example, Patent Literatures 1 to 4 and Non-Patent Literatures 1 to 3).

Patent Literature 1 JP2009-87235A.

Patent Literature 2 JP2010-26596A.

Non-Patent Literature 1 Roe, Robert M.; Busemeyer, Jermone R.; Townsend, James T.; "Multichoice decision field theory: A dynamic connectionst model of decision making.", Psychological Review, Vol. 108(2), April 2001, 370-392.

Non-Patent Literature 2 Hruschka, Harald.; "Analyzing market baskets by restricted Boltzmann machines.", OR Spectrum, August 2012, 1-20.

Non-Patent Literature 3 Teppan, Erich Christian; Alexander Felfernig; "Minimization of product utility estimation errors in recommender result set evaluations, "Proceedings of the 2009 IEEE/WIC/ACM International Joint Conference on Web Intelligence and Intelligent Agent Technology-Volume 01. IEEE Computer Society, 2009.

Non-Patent Literature 4 Shenoy, P.; Yu., A. J.; "Rational preference shifts in multi-attribute choice: What is fair?", Internet <URL:http://www.cogsci.ucsd.edu/~ajyu/Papers/jdm_cogsci13.pdf>, 2013.

Non-Patent Literature 5 Hinton, G. E.; Salakhutdinov, R.; "Replicated softmax: an undirected topic model.", Advances in Neural Information Processing Systems 22, NIPS 2009, pp. 1607-1614.

SUMMARY OF INVENTION

Technical Problems

Such cognitively-biased selection behavior of the consumer affects relative selection probabilities of products according to the combination of kinds of items included in a product list of choices. It is difficult to represent the selection behavior using a known model. Even if the cognitive biases are modeled, the model is complicated. Further, a learning algorithm is not known for those complicated models. It is not known that, in such selection behavior, the selection behavior is modeled taking into account features values of products.

Solution to Problems

In a first aspect of the present invention, there are provided a processing apparatus that generates a selection model obtained by modeling selection behavior of a selection entity that selects at least one choice out of presented input choices, the processing apparatus including: an acquiring unit configured to acquire training data including a plurality of input feature vectors that indicate features of a plurality of the input choices presented to the selection entity and an output feature vector that indicates a feature of an output choice, which is a choice selected by the selection entity out of the plurality of input choices; an input combining unit configured to combine the plurality of input feature vectors to generate an input combined vector; and a learning processing unit configured to learn a selection model on the basis of the input combined vector and the output feature vector, a processing method for the processing apparatus, and a program for causing a computer to operate as the processing apparatus.

In a second aspect of the present invention, there are provided an estimating apparatus that estimates, using a selection model obtained by modeling selection behavior of a selection entity that selects at least one choice out of presented input choices, selection behavior of the selection entity, the estimating apparatus including: an acquiring unit configured to acquire a plurality of input feature vectors that indicate features of a plurality of the input choices presented to the selection entity; a selecting unit configured to select an output feature vector of an output choice, which is a choice, possibility of which being selected by the selection entity is estimated, out of the plurality of input feature vectors corresponding to the plurality of input choices; an input combining unit configured to combine the plurality of input feature vectors to generate an input combined vector; and an estimating unit configured to estimate, on the basis of the input combined vector and the output feature vector, possibility of the output choice being selected in the selection model, an estimating method for the estimating apparatus, and a program for causing a computer to operate as the estimating apparatus.

Note that the summary of invention does not enumerate all necessary features of the present invention. Sub-combinations of these feature groups could be inventions.

BRIEF DESCRIPTION OF DRAWINGS

FIG. 1 illustrates a first example of a cognitive bias according to an embodiment;

FIG. 2 illustrates a second example of the cognitive bias according to the embodiment;

FIG. 3 illustrates a third example of the cognitive bias according to the embodiment;

FIG. 4 illustrates a configuration example of a processing apparatus 100 according to the embodiment;

FIG. 5 illustrates an operation flow of the processing apparatus 100 according to the embodiment;

FIG. 6 illustrates an example of training data according to the embodiment;

FIG. 7 shows an example of training data according to the embodiment;

FIG. 8 shows an example of a conversion table used by a binarizing unit 112 according to the embodiment;

FIG. 9 shows an example in which the binarizing unit 112 according to the embodiment converts feature vectors of products into binary vectors using the conversion table shown in FIG. 8;

FIG. 10 illustrates an example of a selection model 10 according to the embodiment;

FIG. 11 illustrates a modification of the processing apparatus 100 according to the embodiment;

FIG. 12 illustrates an example of probabilities that choices calculated by an estimating unit 170 according to the embodiment are selected;

FIG. 13 shows a configuration example of an estimating apparatus 200 according to the embodiment;

FIG. 14 shows a first modification of the selection model 10 according to the embodiment;

FIG. 15 shows a second modification of the selection model 10 according to the embodiment;

FIG. 16 shows a third modification of the selection model 10 according to the embodiment;

FIG. 17 shows a fourth modification of the selection model 10 according to the embodiment; and FIG. 18 is an example of a hardware configuration of a computer 1900 functioning as the processing apparatus 100 and the estimating apparatus 200 according to the embodiment.

DESCRIPTION OF EMBODIMENTS

The present invention is explained below with reference to an embodiment of the invention. However, the embodiment does not limit inventions according to the scope of claims. All combinations of features explained in the embodiment are not always essential to the solution of the invention.

It is known that, in behavior of a selection entity such as a person (a consumer) and an animal presented with a plurality of choices to select any one of the choices on the basis of preferences and the like, selection results of the selection behavior change according to the given choices. In this embodiment, as an example of such selection behavior, selection behavior of a consumer to select one product out of a plurality of products is explained.

When a consumer selects one or a plurality of products out of a plurality of products, selection behavior of the consumer is variously cognitively biased. For example, when a plurality of products including a first commodity and a second commodity are presented respectively to the consumer as choices, a fraction of probabilities that the respective first and second products are selected by the consumer is sometimes different according to the other products included in a plurality of presented choices. In this case, the presence of the other products included in a plurality of presented choices cognitively biases the selection behavior of the consumer.

FIG. 1 illustrates a first example of a cognitive bias according to this embodiment. FIG. 1 is a diagram for explaining a similarity effect, which is the cognitive bias in this embodiment. In FIG. 1, products A, B, and S are choices presented to the consumer. In a graph of FIG. 1, as an example of characteristics of the products, a price is plotted on the abscissa and the products A, B, and S are plotted on the ordinate as quality. Note that, in the abscissa, a + direction indicates that price decreases and, in the ordinate, a + direction indicates that quality increase. That is, the product A is a product having a high price and high quality compared with the product B. The product S is a product similar to the product A having a high price and high quality compared with the product B.

First, when there are choices of the product A and the product B in the market, shares of the products A and B are determined according to probabilities that the respective products A and B are selected by the consumer. When the product S is added to the market, since the product S is similar to the product A, the share of the product A is sometimes reduced to change a fraction of the shares of the products A and B. That is, in this case, with respect to the choices of the products A and B, the presence of the product S similar to the product A cognitively biases the selection behavior of the consumer such that the share of the product A is divided by the products A and S. Such an effect of the cognitive bias is called similarity effect.

FIG. 2 illustrates a second example of the cognitive bias according to this embodiment. FIG. 2 is a diagram for explaining a compromise effect, which is the cognitive bias in this embodiment. In FIG. 2, products A, B, and C are choices presented to the consumer. In a graph of FIG. 2, as in FIG. 1, as an example of characteristics of the products, a price is plotted on the abscissa and the products A, B, and C are plotted on the ordinate as quality. That is, the product A is a product having a high price and high quality compared with the product B. The product C is a product having a low price and low quality compared with the product B.

First, when there are choices of the product A and the product B in the market, shares of the products A and B are determined according to probabilities that the respective products A and B are selected by the consumer (initial state). When the product C is added to the market, prices and degrees of quality of the products A, B, and C are arranged in this order. The share of the product A having the high price and the high quality is sometimes reduced to change a fraction of the shares of the products A and B.

For example, with respect to the choices of the products A and B, the presence of the product C lower than the product B in both the price and the quality forms ranks of balances of the prices and the quality of the products. The share of the product A having the high price and the high quality is divided by the product A and the product C. As a result, the share of the product B having the intermediate price and the intermediate quality is improved. Such an effect of cognitively biasing the selection behavior of the consumer with the product C is called compromise effect.

FIG. 3 illustrates a third example of the cognitive bias according to this embodiment.

FIG. 3 is a diagram for explaining an attraction effect, which is the cognitive bias in this embodiment. In FIG. 3, products A, B, and D are choices presented to the consumer. In a graph of FIG. 3, as in FIG. 1, as an example of characteristics of the products, a price is plotted on the abscissa and the products A, B, and D are plotted on the ordinate as quality. That is, the product A is a product having a high price and high quality compared with the product B. The product D is a product having a slightly high price and slightly low quality compared with the product B.

First, when there are choices of the product A and the product B in the market, shares of the products A and B are determined according to probabilities that the respective products A and B are selected by the consumer. When the product D is added to the market, since the product B relatively has a lower price and higher quality than the product D, the share of the product B is sometimes increased to change a fraction of the shares of the products A and B.

That is, in this case, with respect to the choices of the products A and B, the presence of the product C slightly inferior to the product B both in the price and the quality cognitively biases the selection behavior of the consumer such that a preferable impression is given to the price and the quality of the product B. Such an effect of the cognitive bias is called attraction effect.

As in the three examples explained above, the selection behavior of the consumer in the market is variously cognitively biased. As a result, the shares and the like of the products are determined. Such various cognitive biases change according to feature values such as a specific price of the product and specific quality of the product.

Therefore, for example, when consumption behavior of the consumer is analyzed and when products are recommended to the consumer, it is desirable to use a model that takes into account the cognitive biases. It is more desirable to represent cognitively biased selection behavior of the consumers as a learnable model with high prediction accuracy taking into account feature values of a product (e.g., how high/low a price is and how high/low quality is). However, it is difficult to represent such a model using a conventional learning model. Even if the cognitive biases are modeled, the model is complicated. The model cannot be learned.

Therefore, a processing apparatus 100 in this embodiment represents, as a learnable model, selection behavior of the consumer cognitively biased on the basis of feature values of a product by formularizing the selection behavior as a problem for learning a mapping to an output feature value that indicates a selection item selected out of a plurality of input feature values that indicate a plurality of choices given to the consumer and the like. That is, the processing apparatus 100 generates a selection model obtained by modeling selection behavior of a selection entity that selects at least one choice out of presented input choices.

FIG. 4 shows a configuration example of the processing apparatus 100 according to this embodiment. The processing apparatus 100 includes an acquiring unit 110, a storing unit 120, an input combining unit 130, an output combining unit 140, and a learning processing unit 150. In this embodiment, the processing apparatus 100 presents a plurality of products to the consumer, who is a selection entity, as choices. Behavior of the consumer selecting one or a plurality of products is explained.

The acquiring unit 110 acquires training data including a plurality of input feature vectors that indicate features of a plurality of the input choices presented to the selection entity and an output feature vector that indicates features of an output choice, which is one or a plurality of choices selected by the selection entity out of the plurality of input choices. The acquiring unit 110 acquires, as training data, for example, among a plurality of products, an input choice given to the consumer and an input feature vector corresponding to a feature value of a product included in the input choice.

The acquiring unit 110 acquires, as training data, for example, an output choice, which is one or a plurality of products selected by the consumer out of the input choices, and an output feature vector corresponding to a feature value of the output choice. Note that the processing apparatus 100 treats feature values of products as feature parameters. As the feature parameters, numerical values of real numbers or binary numbers corresponding to the feature values are input.

The acquiring unit 110 may read out and acquire training data stored in an external storage device such as a database in a form decided in advance. The acquiring unit 110 may be connected to a network or the like and acquire training data in a position different from a main body of the processing apparatus 100 and supply the acquired training data to a main body unit via the network. For example, the acquiring unit 110 accesses a server or the like and acquires training data stored in the server. The acquiring unit 110 may acquire, as training data, information such as information of products given to the consumer and a history of products purchased or put in a cart or the like by the consumer from an EC (electronic commerce) site or the like that sells products, services, and the like on a web site.

The acquiring unit 110 may be realized by an individual input device and perform acquisition of training data as pre-processing of the main body of the processing apparatus 100. The acquiring unit 110 supplies the acquired training data to the storing unit 120. The acquiring unit 110 includes a binarizing unit 112.

The binarizing unit 112 binarizes feature parameters of each choice of a plurality of input selection choices and each choice of a plurality of output choices and generates each feature vector of a plurality of input feature vectors and each feature vector of a plurality of output feature vectors. That is, each of the plurality of input feature vectors and the plurality of output feature vectors is changed to a binary vector by the binarizing unit 112. The binarizing unit 112 binarizes feature parameters close to each other to be converted into feature vectors close to each other.

The storing unit 120 is connected to the acquiring unit 110 and stores the training data received from the acquiring unit 110. The storing unit 120 may store a selection model generated by the processing apparatus 100. The storing unit 120 may store intermediate data, a calculation result, parameters, and the like generated (or used) in a process for generating the selection model. The storing unit 120 may supply the stored data to request sources according to requests from the units in the processing apparatus 100.

The input combining unit 130 combines a plurality of input feature vectors to generate an input combined vector. The input combining unit 130 generates, for a plurality of input choices, an input combined vector that takes the same value without depending on the order of the input choices. The input combining unit 130 generates, for example, an input combined vector based on an average of the plurality of input feature vectors.

When the acquiring unit 110 acquires a plurality of input feature vectors, which are binary vectors, the input combining unit 130 may generate an input combined vector based on a logical operation of the plurality of input feature vectors. In this case, the input combining unit 130 generates an input combined vector based on logical OR (logical OR in bit units) for each of elements of the plurality of input feature vectors. The input combining unit 130 supplies the generated input combined vector to the learning processing unit 150.

The output combining unit 140 combines a plurality of output feature vectors concerning a plurality of output choices selected by the selection entity out of a plurality of input choices to generate an output combined vector. When the acquiring unit 110 acquires one output feature vector, the output combining unit 140 sets the one output feature vector as the output combined vector. The output combining unit 140 generates, for the plurality of output choices, an output combined vector that takes the same value without depending on the order of the output choices. The output combining unit 140 generates, for example, an output combined vector based on an average of the plurality of output feature vectors.

When the acquiring unit 110 acquires a plurality of output feature vectors, which are binary vectors, the output combining unit 140 may generate an output combined vector based on a logical operation of the plurality of output feature vectors. In this case, the output combining unit 140 generates an output combined vector based on logical OR (logical OR in bit units) for each of elements of the plurality of output feature vectors. The output combining unit 140 supplies the generated input combined vector to the learning processing unit 150.

The learning processing unit 150 is connected to the input combining unit 130 and the output combining unit 140 and learns the selection model on the basis of the input combined vector and the output combined vector. Note that, when the acquiring unit 110 acquires one output feature vector, the learning processing unit 150 learns the selection model on the basis of the input combined vector and the one output feature vector. The learning processing unit 150 learns the selection model including selection behavior corresponding to a cognitive bias of the selection entity. That is, the learning processing unit 150 learns the selection model using parameters including a bias parameter, a value of which is determined according to a plurality of choices given to the consumer. The learning processing unit 150 stores the learned selection model in the storing unit 120.

The processing apparatus 100 in this embodiment learns a mapping from the input combined vector to the output combined vector using the parameters including the bias parameter and generates a selection model obtained by modeling the selection behavior of the consumer to the given choices. A specific operation of the processing apparatus 100 is explained with reference to FIG. 5.

FIG. 5 shows an operation flow of the processing apparatus 100 according to this embodiment. The processing apparatus 100 in this embodiment functions as a learning apparatus that executes the operation flow shown in FIG. 5 and learns a selection model.

First, the acquiring unit 110 acquires training data (S200). The acquiring unit 110 acquires information concerning J products or services, which are likely to be presented to the consumer, a plurality of presented choices (i.e., D products selected out of the J products), C products selected out of the plurality of choices by the consumer, and the like. In this embodiment, an example is explained in which the acquiring unit 110 acquires five products (A, B, C, D, and S) as the products potentially to be presented to the consumer.

FIG. 6 shows an example of training data according to this embodiment. The abscissa of FIG. 6 indicates a set of products presented to the consumer and the ordinate indicates a distribution of products selected by the consumer. FIG. 6 shows a selection result obtained when five sets of choices are presented to the consumer.

For example, in FIG. 6, a graph indicated by (A, B) on the abscissa indicates that, when products presented to the consumer are A and B (a choice set R1), a fraction of selection of the product A by the consumer is 0.5 and a fraction of selection of the product B is 0.5. As an example, shares of the products A and B in the market are percentages substantially the same as the fractions of the selections by the consumer. In this embodiment, a result of the presentation of such a choice set R1 is training data in an "initial state" for causing the user to select a product first.

A graph of (A, B, B) indicates that, when one product A and two products B are presented to the consumer as choices (a choice set R2), a result is obtained that a fraction of selection of the product A by the consumer is 0.4 and a fraction of selection of the products B is 0.6 (a fraction of selection of one product B is 0.3 and a fraction of selection of the other product B is. 0.3). That is, the graph of (A, B, B) indicates a change in selection behavior of the consumer in the case in which the product B is added to the choice set R1 in the initial state. A graph of (A, B, S) indicates that, when three products A, B, and S are presented to the consumer as choices (a choice set R3), a result is obtained that a fraction of selection of the product A by the consumer is 0.4, a fraction of selection of the product B is 0.35, and a fraction of selection of the product S is 0.25.

A graph of (A, B, D) indicates that, when three products A, B, and D are presented to the consumer as choices (a choice set R4), a result is obtained that a fraction of selection of the product A by the consumer is 0.4, a fraction of selection of the product B is 0.6, and a fraction of selection of the product D is 0. A graph of (A, B, C) indicates that, when three products A, B, and C are presented to the consumer as choices (a choice set R5), a result is obtained that a fraction of selection of the product A by the consumer is 0.3, a fraction of selection of the product B is 0.6, and a fraction of selection of the product C is 0.1.

FIG. 7 shows an example of feature values of training data according to this embodiment. FIG. 7 shows feature values of products. The abscissa indicates lowness of prices of the products and the ordinate indicates highness of quality of the products. That is, in this embodiment, an example is explained in which the feature values of the products are treated as two feature parameters, i.e., a price and quality of a product and a feature vector includes the feature parameters as elements. The two feature parameters may be real numbers respectively standardized to values decided in advance. FIG. 7 shows an example in which values of products E and F are used and the feature parameters are standardized such that a maximum value of the feature parameters is 100 and a minimum value is 0. That is, when the feature vector is indicated by (price, product), the product E (100, 100) and the product F (0, 0). Note that, in FIG. 7, the products A, B, C, D, and S are products that are likely to be presented to the consumer explained with reference to FIG. 6.

That is, compared with the product B, the product A is a product high in a price but is high in quality. It is seen from the graph (A, B) of FIG. 6 that shares in the choice set R1 including the products A and B as the choices are 50:50. Note that, input feature vectors in this case are represented as, for example, the product A (price, quality) and the product B (price, quality) using feature vectors of the products A and B. When the consumer selects one choice, an output feature vector is the product A (price, quality) or the product B (price, quality).

Shares of the choice set R2 including the one product A and the two products B as the choices are 40:30:30 from the graph (A, B, B) of FIG. 6. This is training data indicating a result of the presence of the two same products B cognitively biasing the selection behavior of the consumer such that the same products divide a share.

The product S is a product similar to the product B. Shares of the choice set R3 including the products A, B, and S as the choices are 40:35:20 from the graph (A, B, S) of FIG. 6. This is training data indicating a result (a similarity effect) of the presence of the product S similar to the product B cognitively biasing the selection behavior of the consumer such that the similar products divide a share.

Note that the input feature vectors in this case are feature vectors of the products A, B, and S, for example, the product A (price, quality), the product B (price, quality), and the product S (price, quality). The output feature vector is any one of the input feature vectors.

The product D is a product having a slightly high price and slightly low quality compared with the product B. Shares of the choice set R4 including the products A, B, and D are 40:60:0 from the graph (A, B, D) of FIG. 6. This is training data indicating a result (an attraction effect) of the presence of the product D slightly inferior in a price and quality compared with the product B cognitively biasing the selection behavior of the consumer such that a preferable impression is given to the price and the quality of the product B to improve the share of the product B.

Note that the input feature vectors in this case are feature vectors of the products A, B, and D, for example, the product A (price, quality), the product B (price, quality), and the product D (price, quality). The output feature vector is any one of the input feature vectors.

The product C is a product low in a price and low in quality compared with the product B. Shares of the choice set R5 including the products A, B, and C as the choices are 30:60:10 from the graph (A, B, C) of FIG. 6. This is training data indicating a result (a compromise effect) of the presence of the product C low in a price and low in quality cognitively biasing the selection behavior of the consumer such that the order of balances of prices and quality of the products is formed and, as a result, the share of the product B intermediate in both of the price and the quality is improved.

Note that the input feature vectors in this case are feature vectors of the products A, B, and C, for example, the product A (price, quality), the product B (price, quality), and the product C (price, quality). The output feature vector is any one of the input feature vectors. The acquiring unit 110 acquires the training data explained above and stores the training data in the storing unit 120.

Subsequently, the binarizing unit 112 binarizes elements of real numbers of the input feature vectors and the output feature vector, respectively (S210). An example of binary conversion by the binarizing unit 112 is explained with reference to FIG. 8.

FIG. 8 shows an example of a conversion table used by the binarizing unit 112 according to this embodiment. FIG. 8 shows an example of a conversion table for binarizing the elements of the feature vectors. The abscissa of FIG. 8 indicates 201 node IDs of 0 to 200. The ordinate indicates standardized values (in this embodiment, values of 0 to 100) of feature parameters. A white region of the conversion table indicates a region where the values are 0 and regions indicated by hatching indicate regions where the values are 1.

The binarizing unit 112 sets, as a binary value of a node ID, a value of a region including an intersection of a straight line extending in the abscissa direction from a value of the ordinate coinciding with a value of a feature parameter that should be converted and a straight line extending in the ordinate direction from the node ID. For example, the binarizing unit 112 converts all of feature parameters of the product F having a price 0 and quality 0 into binary values in which the nodes 0 to 100 are set to 0 and the nodes 101 to 200 are set to 1.

Note that, after converting the plurality of feature parameters respectively into the binary values, the binarizing unit 112 couples a plurality of binary values after the conversion as a binary vector. That is, for the product F (0, 0), the binarizing unit 112 converts the feature parameters into a binary vector in which the nodes 0 to 100 is set to 0, the nodes 101 to 200 are set to 1, the nodes 201 to 301 are set to 0, and the nodes 302 to 401 are set to 1. Similarly, for the product E (100, 100), the binarizing unit 112 converts the feature parameters into a binary vector in which the nodes 0 to 100 is set to 1, the nodes 101 to 200 are set to 0, the nodes 201 to 301 are set to 1, and the nodes 302 to 401 are set to 0.

In this way, the binarizing unit 112 converts a value of one feature parameter into binary values with the number of nodes 201 and couples two binary values to convert one feature vector including two feature parameters into a binary vector with the number of nodes 402. In the conversion table shown in FIG. 8, the regions of the values of the nodes continuously change with respect to an increase and a decrease of the feature parameters. Therefore, feature parameters having close (similar) values are converted into feature vectors close (similar) to each other.

FIG. 9 shows an example in which the binarizing unit 112 according to this embodiment converts features vectors of products into binary vectors using the conversion table shown in FIG. 8. The abscissa of FIG. 9 indicates 402 node IDs of 0 to 401 and the ordinate indicates the products. White regions in the figure indicate regions where values of nodes are 0 and regions indicated by hatching indicate regions where values are 1.

Binary vectors corresponding to the products A, B, C, D, and S are vectors $a=(a_i)_{i=1,\ldots,402}$, $b=(b_i)_{i=1,\ldots,402}$, $c=(c_i)_{i=1,\ldots,402}$, $d=(d_i)_{i=1,\ldots,402}$, $s=(s_i)_{i=1,\ldots,402}$ with the number of elements 402. For example, for the choice set R1, the binarizing unit 112 sets the input feature vectors as a and b and sets the output feature vector as a or b. In this way, the binarizing unit 112 converts the input feature vectors and the output feature vectors into a binary vector of K dimensions (in this embodiment, 402 dimensions).

Subsequently, the input combining unit 130 combines the input feature vectors (S220). In this embodiment, an example is explained in which the input combining unit 130 calculates an average of each of the elements of the input feature vectors to thereby combine input feature values. That is, for example, the input combining unit 130 calculates, as indicated by the following expression, an input combined vector $x^{R1}=(x^{R1}_i)_{i=1,\ldots,402}$ with the number of elements 402 obtained by combining a feature vector a of an input A and a feature vector b of B of the choice set R1.

$$x^{R1}_i = \{a_i + b_i\}/2 \quad i=1, 2, \ldots, 402 \qquad \text{Expression 1}$$

Similarly, the input combining unit 130 calculates, as indicated by the following expression, an input combined vector $x^{Rn}=(x^{Rn}_i)_{i=1,\ldots,402}$ obtained by combining input feature vectors of the choice sets R2 to R5. In this way, the input combining unit 130 generates input combined vectors, elements of which are real numbers, and supplies the input combined vectors to the learning processing unit 150.

$$x^{R2}_i = \{a_i + 2b_i\}/3$$

$$x^{R3}_i = \{a_i + b_i + s_i\}/3$$

$$x^{R4}_i = \{a_i + b_i + d_i\}/3$$

$$x^{R5}_i = \{a_i + b_i + c_i\}/3 \qquad \text{Expression 2}$$

Subsequently, the output combining unit 140 combines output feature vectors (S230).

Note that, in this embodiment, when the consumer selects one choice among a plurality of given choices, the number of output feature vectors is 1. In this case, the output combining unit 140 directly sets the output feature vector as an output combined vector. That is, for example, when the consumer selects the product A for the choice set R1, the output combining unit 140 outputs the output feature vector a with the number of elements 402 as an output combined vector $y^{R1A}(y^{R1A}_j)_{j=1,\ldots,402}$. When the consumer selects the product B for the choice set R1, the output combining unit 140 outputs the output feature vector b with the number of elements 402 as an output combined vector $y^{R1B}$ $(y^{R1B}_j)_{j=1,\ldots,402}$.

As an example, the output combining unit 140 generates, as indicated by the following expression, an output combined vector $y^{RnM}(y^{RnM}_j)_{j=1,\ldots,402}$ for each of choice sets and supplies the output combined vector $y^{RnM}$ $(y^{RnM}_j)_{j=1,\ldots,402}$ to the learning processing unit 150. That is, the output combined vector $y^{RnM}$ indicates a case in which the consumer selects M from the choice set Rn including the product M.

$$y^{R1A}_j = a_i$$

$$y^{R1B}_j = b_i$$

$$y^{R2A}_j = a_i$$

$$y^{R2B}_j = b_i$$

$$y^{R3A}_j = a_i$$

$$y^{R3B}_j = b_i$$

$$y^{R3S}_j = s_i$$

$$y^{R4A}_j = a_i$$

$$y^{R4B}_j = b_i$$

$$y^{R4D}_j = d_i$$

$$y^{R5A}_j = a_i$$

$$y^{R5B}_j = b_i$$

$$y^{R5C}_j = c_i$$

$$j = i = 1, 2, \ldots, 402 \qquad \text{Expression 3}$$

Subsequently, the learning processing unit 150 executes learning of a selection model using the input combined vector and the output combined vector for learning (S240). In the training data in this embodiment, for example, a fraction (0.5/0.5) of selection probabilities of the product A and the product B in the initial state changes to a different fraction (0.4/0.35) according to a result of the similarity effect. Similarly, the fraction changes to different fractions according to choices, for example, the fraction (0.3/0.6) by a result of the compromise effect and the fraction (0.4/0.6) by a result of the attraction effect.

It has been difficult to model selection behavior in which, according to a plurality of choices presented to the consumer, a fraction of selection rates of products included in the plurality of choices changes. It has not been known that the selection behavior including feature values of the choices is modeled. Therefore, the learning processing unit 150 in this embodiment formularizes the selection behavior of the consumer as a problem for learning a mapping from an input combined vector to an output combined vector and learns a selection model in which a fraction of selection rates of choices included in input choices could be different according to a combination of the other choices included in the input choices and the feature values of the choices.

FIG. 10 shows an example of a selection model 10 according to this embodiment. The selection model 10 includes an input layer 12, an output layer 14, and an intermediate layer 16. The input layer 12 corresponds to the input combined vector and the output layer 14 corresponds to the output combined vector. Each of the input layer 12 and the output layer 14 includes K input nodes. The intermediate layer 16 includes L input nodes. That is, the selection model 10 includes a plurality of input nodes corresponding to a plurality of input feature values included in the input combined vector, a plurality of output nodes corresponding to a plurality of output feature values included in the output combined vector, and a plurality of intermediate nodes.

The input nodes respectively correspond to elements of a K-dimensional real number vector. Values of the nodes are substantially the same as values of the elements of the input combined vector. For example, the input layer 12 sets a value of an input node $x_i$ (i=1, 2, . . . , and K) to correspond to an input combined vector. Similarly, the output nodes respectively correspond to the elements of the K-dimensional real number vectors. Values of the nodes are substantially the same as values of the elements of the output combined vector. For example, the output layer 14 sets a value of an output node $y_j$ (j=1, 2, . . . , and K) to correspond to an output combined vector.

The number L of intermediate nodes $h_1$ of intermediate layer 16 is a natural number equal to or larger than 1 and may be the same as the number K of the input nodes (the number of output nodes). As an example, a value of the intermediate node $h_1$ is a nonzero value (e.g., 1) or 0. The intermediate layer 16 is a hidden layer used to represent input and output characteristics of a selection model. As the value of the intermediate node $h_1$ included in the intermediate layer 16, the value of 1 or 0 does not have to be uniquely calculated as a result. For example, a distribution of probabilities having the value 1 or 0 may be obtained. The value of the intermediate node $h_1$ is indicated by the following expression:

$$h_l \in \{0, 1\}, \, l \in \{1, 2, \ldots, L\} \qquad \text{Expression 4}$$

Complexity of input and output characteristics, which the selection model 10 can represent, can be increased or reduced according to the number L of intermediate nodes. Therefore, to increase characteristics desired to be represented, it is preferable to increase the number L of intermediate nodes. On the other hand, a computational amount necessary for learning of the selection model 10 increases according to the increase in the number L of intermediate nodes. Therefore, to execute the learning at higher speed, it is preferable to reduce the number L of intermediate nodes. Taking these into account, a user or the like of the processing apparatus 100 may set the number L of intermediate nodes to a predetermined proper value.

In the selection model 10, a plurality of weight parameters are provided between a plurality of input nodes and a plurality of intermediate nodes and between a plurality of output nodes and the plurality of intermediate nodes. That is, first weight values $W_{i1}$ are set between input nodes $x_i$ and intermediate node $h_i$. The input nodes $x_i$ and the intermediate nodes $h_1$ are respectively connected. The first weights $W_{i1}$ are respectively added to flows of data by the connection. In the selection model 10, second weight values $U_{j1}$ are set between the intermediate nodes $h_1$ and the output nodes $y_j$. That is, the intermediate nodes $h_1$ and the output nodes $y_j$ are respectively connected. The second weights $U_{j1}$ are respectively added to flows of data by the connection.

The first weights $W_{i1}$ and the second weights $U_{j1}$ are symmetrical weights for adding a fixed weight to the flows irrespective of the directions of the transmission of the data. The nodes in the layers are not connected to one another. The input nodes $x_i$ and the output nodes $y_j$ do not have to be connected to each other. In this embodiment, an example is explained in which the input nodes $x_i$ and the output nodes $y_j$ are not connected.

In the selection model 10, input biases, intermediate biases, and output biases are further set for the nodes included in the input layer 12, the intermediate layer 16, and the output layer 14. That is, input biases $b_i^x$ are respectively set for the input nodes $x_i$ of the input layer 12. Similarly, output biases $b_j^y$ are respectively set for the output nodes $y_j$ of the output layer 14. Intermediate biases $b_1^h$ are respectively set for the intermediate nodes $h_1$ of the intermediate layer 16.

The learning processing unit 150 learns the first weights $W_{i1}$ between the input nodes $x_i$ and the intermediate nodes $h_1$ and the second weight values $U_{j1}$ between the intermediate nodes $h_1$ and the output nodes $y_j$. The learning processing unit 150 further learns the input biases $b_i^x$ of the input layer 12, the intermediate biases $b_1^h$ of the intermediate layer 16, and the output biases $b_j^y$ of the output layer 14. That is, the learning processing unit 150 learns the first weight values $W_{ki}$, the second weight values $U_{jk}$, the input biases $b_i^x$, the intermediate biases $b_1^h$, and the output biases $b_j^y$ as parameters. As an example, the learning processing unit 150 sets the parameters as elements of a vector θ and learns the parameters using the parameter vector θ ($W_{i1}$, $U_{j1}$, $b_i^x$, $b_1^h$, $b_j^y$).

For example, the learning processing unit 150 learns a selection model based on a restricted Boltzmann machine. The Boltzmann machine is a system that is configured by probabilistic elements, which operate probabilistically, outputs various values according to probabilities even if being caused to operate with an input fixed, and obtains appearance probabilities (appearance frequencies) of the outputs from observation system rows (e.g., time system rows) of the outputs. When each of the probabilistic elements are settled in a probabilistic equilibrium state, that is, when an appearance probability of a state of each of the probabilistic elements is substantially fixed, an appearance probability of a state a is proportional to a Boltzmann distribution ($\exp\{-E(\alpha)/T\}$).

That is, the appearance probability of the state of the Boltzmann machine in the probabilistic equilibrium state is uniquely determined from an input. Note that the Boltzmann machine sometimes causes, according to an initial value, a transitional period in which the appearance probability temporally fluctuates. However, by causing the Boltzmann machine to operate for a sufficiently long time until the influence of the initial value decreases, the appearance probability converges to a temporally substantially fixed value. In this embodiment, an example is explained in which the selection model is learned on the basis of such Boltzmann machine in the probabilistic equilibrium state.

The learning processing unit 150 generates an input and output sample vector $s^{1m}=(x^1, y^{1m})$ (or an input and output sample row, an input and output sample array, etc.) including elements of an input combined vector and an output combined vector. The learning processing unit 150 may generate input and output sample vectors by a number corresponding to a selection rate, which is a selection result by the consumer. In this embodiment, an example is explained in which the learning processing unit 15 generates input and output sample vectors by a number proportional to the selection rate.

For example, when a result of selection of the product A by the consumer responding to the presentation of the choice set R1 in the initial state is 50%, the learning processing unit 150 generates ten input and output sample vectors $s^{R1A}$ corresponding to the result. In this case, when a result of selection of the product B responding to the presentation of the choice set R1 is 50%, the learning processing unit 150 generates ten input and output sample vectors $s^{R1B}$ corresponding to the result. As an example, the learning processing unit 150 generates the input and output sample vector $s^{1m}$ as indicated by the following expression. Note that, in the following expression, the numbers of vectors generated by the learning processing unit 150 are also shown.

$s^{R1A}=(x^{R1}, y^{R1A})$: ten $s^{R1B}=(x^{R1}, y^{R1B})$: ten $s^{R2A}=(x^{R2}, y^{R2A})$: eight $s^{R2B}=(x^{R2}, y^{R2B})$: twelve $s^{R3A}=(x^{R3}, y^{R3A})$: eight $s^{R3B}=(x^{R3}, y^{R3B})$: seven $s^{R3S}=(x^{R3}, y^{R3S})$: four $s^{R4A}=(x^{R4}, y^{R4A})$: eight $s^{R4B}=(x^{R4}, y^{R4B})$: twelve $s^{R4D}=(x^{R4}, y^{R4D})$: zero $s^{R5A}=(x^{R5}, y^{R5A})$: six $s^{R5B}=(x^{R5}, y^{R5B})$: twelve $s^{R5D}=(x^{R5}, y^{R5C})$: two The learning processing unit 150 learns the selection model 10 using a hundred input and output sample vectors in total shown in Expression (5) as samples for learning. The learning processing unit 150 may use, as the samples for learning, data set obtained by shuffling the hundred input and output sample vectors in total at random.

The learning processing unit 150 updates the parameter vector θ such that p(y|x) is higher for each of the input and output sample vectors. Here, p(y|x) indicates a conditional probability that the output combined vector is y when the input combined vector is x.

For example, the learning processing unit 150 updates the parameters to increase probabilities that the output combined vector is acquired according to the input combined vector (i.e., the conditional probability p(y|x)) concerning each of input and output sample vectors that indicate selection behavior for learning. In this case, the learning processing unit 150 updates the parameters in a gradient direction in which the conditional probability p(y|x) is probabilistically increased. That is, the learning processing unit 150 calculates a gradient with respect to the parameter vector θ of the conditional probability p(y|x) based on the selection model 10 shown in FIG. 10 and increases or decreases to update each of the elements of the parameter vector θ in the direction in which the conditional probability p(y|x) increases.

The conditional probability p(y|x) based on the selection model 10 shown in FIG. 10 can be indicated using an energy function E(x, y, h;θ) and free energy F(x, y;θ) indicated by the following expression. Here, a probability distribution of x having the parameter θ is represented as p(x;θ).

$$E(x, y, h; \theta) = -x^T W h - y^T U h - x^T b_x - y^T b_y - h^T b_h \quad \text{Expression 6}$$

$$\theta = \{W, U, b_x, b_y, b_h\}$$

$$F(x, y; \theta) = -x^i W h - y^i U h - x^T b_x - y^t b_y - h^t b_h[\hat{h}]_i \equiv \quad \text{Expression 7}$$

$$p(h_l = 1 \mid x, y; \theta) =$$

$$\sigma\left(b_l + \sum_{i=1}^{K} x_i W_{il} + \sum_{j=1}^{K} y_j U_{jl}\right) l \in [1, L]$$

From Expression (6) and Expression (7), the conditional probability p(y|x) is indicated by the following expression. Such a specific method of calculating the conditional probability p(y|x) using the energy function and the free energy of the Boltzmann machine on the basis of the selection model 10 is known.

$$p(y \mid x; \theta) = \frac{\exp\{-F(x, y; \theta)\}}{\sum_y \exp\{-F(x, y; \theta)\}} \quad \text{Expression 8}$$

The learning processing unit 150 calculates a gradient with respect to the parameter vector θ of the conditional probability p(y|x) from the following expression calculated from Expression (6) to Expression (8).

$$\nabla_\theta \ln p(y \mid x; \theta) = -\nabla_\theta \sum_h E(x, y, h; \theta) + \quad \text{Expression 9}$$

$$\nabla_\theta \sum_y \sum_h E(x, y, h; \theta)$$

$$= -\nabla_\theta F(x, y; \theta) + \nabla_\theta F(x; \theta)$$

$$= -\nabla_\theta F(x, y; \theta) +$$

$$\sum_{y \in C(x)} p(y \mid x; \theta) \nabla_\theta F(x, y; \theta)$$

Here, C(x) in Expression (9) is a set including a vector representing an element, which is 1 in the input combined vector x, using one-hot coding (a coding method of representation by a vector, one element of which is 1 and all the other elements of which are 0).

The learning processing unit 150 updates the parameter vector θ for each of the input and output sample vectors from a predetermined initial value using Expression (9). As an example, the learning processing unit 150 increases the elements of the parameter vector θ of the initial value by predetermined values (ΔW, ΔU, Δb$^x$, Δb$^h$, and Δb$^y$) in an increasing (plus) direction of the gradient of Expression (9) in which the initial value is substituted. For example, the learning processing unit 150 repeats the update until the increase or the decrease of the conditional probability p(y|x) converges within a predetermined range. Instead, the learning processing unit 150 may repeat the update a predetermined number of times.

The learning processing unit 150 may repeat the update of the parameter vector θ from a plurality of initial values respectively. In this case, as an example, the learning processing unit 150 repeats the update until each of the elements of the parameter vector θ converges within a predetermined range. Consequently, the learning processing unit 150 can set the parameter vector θ having higher accuracy.

The learning processing unit 150 may change the initial value, for example, when the increase or decrease of the conditional probability p(y|x) does not converge or when a part or all of the elements of the parameter vector θ do not converge. A specific method of calculating a gradient of the conditional probability p(y|x) and updating the parameters in a gradient direction to increase the conditional probability p(y|x) in this way is known as "discriminative training".

As explained above, the learning processing unit 150 in this embodiment can learn, on the basis of the restricted Boltzmann machine, the selection model 10 obtained by modeling the cognitively-biased selection behavior of the consumer using the feature value of choices. The learning processing unit 150 can learn the selection model 10 according to a known learning algorithm without using a complicated and special algorithm. The learning processing unit 150 stores the parameter vector θ of the learned selection model 10 in the storing unit 120. The processing apparatus 100 may supply the selection model 10 learned by the learning processing unit 150 to an external estimating apparatus, a storing unit, and the like.

In the processing apparatus 100 according to this embodiment explained above, the example is explained in which the consumer selects one choice out of a plurality of choices. Instead, the consumer may select a plurality of choices out of the plurality of choices. In this case, the output combining unit 140 combines a plurality of output feature vectors corresponding to the plurality of choices selected by the consumer. The output combining unit 140 may combine the output feature vectors in the same manner as the operation of the input combining unit 130 combining the plurality of input feature vectors. Consequently, a value input to the output node of the selection model 10 is a real number value like the value input to the input node.

Note that the example is explained in which the input combining unit 130 according to this embodiment calculates an average of each of the elements of the input feature vectors and generates an input combined vector. Instead, the input combining unit 130 may calculate logical OR (logical OR in bit units) of each of the elements of the input feature vectors. Note that the input combining unit 130 generates, on the basis of the input feature vectors, an input combined vector that indicates features of input choices presented to the consumer. Therefore, the input combined vector only has to be able to be calculated as mapping invariable with respect to rearrangement of the arrangement of the elements of the input feature vectors. The calculation method is not limited to an arithmetic mean and logical OR.

The example is explained in which the binarizing unit 112 according to this embodiment converts feature vectors of products into binary vectors using the conversion table shown in FIG. 8. However, the binarizing unit 112 only has to binarize feature parameters closer to each other to be converted into feature vectors closer to each other and represent similarity and the like of the products. For example, the binarizing unit 112 may binarize the feature parameters to be reflected on a Hamming distance. Therefore, the conversion table is not limited to the table shown in FIG. 8.

A binary conversion operation of the binarizing unit 112 is not limited to the operation performed using the conversion table. For example, the binarizing unit 112 may use a known conversion method as locality sensitive hashing (LSH), in particular, SimHash, which is one of the LSH, or deep learning. Note that Deep learning can binarize even images, sound, music, natural languages, and the like. Therefore, if the binarizing unit 112 is implemented with the function of the Deep learning, the processing apparatus 100 can learn selection behavior performed when input choices including images, sound, music, and natural languages are presented to the selection entity.

FIG. 11 shows a modification of the processing apparatus 100 according to this embodiment. In the processing apparatus 100 in this modification, components that perform operations substantially the same as the operations of the components of the processing apparatus 100 according to this embodiment shown in FIG. 4 are denoted by the same reference numerals and explanation of the components is omitted. The processing apparatus 100 in this modification further includes a selecting unit 160 and an estimating unit 170 and has a function of predicting selection behavior of the selection entity in addition to the function of learning selection behavior of the selection entity of the processing apparatus 100 according to this embodiment shown in FIG. 4.

The learning operation of the processing apparatus 100 in this modification is substantially the same as the operation explained with reference to FIG. 4 to FIG. 10. Therefore, explanation of the learning operation is omitted. When the processing apparatus 100 in this modification predicts selection behavior of the selection entity, the acquiring unit 110 acquires a plurality of input feature vectors corresponding to a plurality of input choices presented to the selection entity. For example, when selection behavior is predicted after the choice set R1 is presented to the consumer, the acquiring unit 110 acquires feature vectors (the product A (price, quality), the product B (price, quality)) of the products A and B included in the choice set R1. The input combining unit 130 combines a plurality of input feature vectors to generate an input combined vector and supplies the input feature vectors to the selecting unit 160.

The selecting unit 160 selects, out of the plurality of input feature vectors corresponding to the plurality of input choices, an output feature vector of an output choice, which is a choice, possibility of which being selected by the selection entity is estimated. For example, in order to estimate all possibilities of the consumer selecting one product, the selecting unit 160 may select a plurality of choices included in the input choices one by one in order and set the choices as a plurality of output choices. For example, in order to estimate all possibilities of the consumer selecting C products, the selecting unit 160 may select all combinations of the C choices one by one in order among a plurality of choices included in the input choices and set the combinations as a plurality of output choices.

The estimating unit 170 estimates, on the basis of the input combined vector and the output feature vector, possibility of the output choices being selected in the selection model. The estimating unit 170 calculates, on the basis of the learned selection model, probability of the output combined vector being selected with respect to the input combined vector. Note that, when the consumer sets one choice as an output choice among the input choices presented to the consumer, the output combined vector is substantially the same as the output feature vector.

Instead, when the consumer sets a plurality of choices as output choices among the input choices presented to the consumer, the output combining unit combines a plurality of output feature vectors corresponding to a plurality of output choices, possibility of which being selected by the consumer is estimated, to generate an output combined vector and supplies the output combined vector to the selecting unit 160. In this case, the estimating unit 170 estimates, on the basis of the input combined vector and the output combined vector, possibility of output choices being selected in the selection model.

The estimating unit 170 estimates, using a plurality of weight parameters provided between a plurality of input nodes and a plurality of intermediate nodes and between a plurality of output nodes and the plurality of intermediate nodes, on the basis of a state of the selection model in the case in which the input combined vector is given to the plurality of input nodes and the output combined vector is given to the plurality of output nodes, possibility of a plurality of output choices being selected. The estimating unit 170 is connected to the storing unit 120 and reads out, from the storing unit 120, the selection model used for the learning and the parameters decided by the learning.

The estimating unit 170 calculates, on the basis of the parameters vector $\theta$ including the first weight values, the second weight values, the input biases, the intermediate biases, and the output biases, probabilities that the respective choices are selected according to input choices. The estimating unit 170 may calculate, using Expression (8), the probability that the choices are selected.

FIG. 12 illustrates an example of the probabilities that the choices calculated by the estimating unit 170 according to this embodiment are selected. FIG. 12 is an example of a result obtained by learning the selection model 10 targeting the training data shown in FIG. 6. That is, contents respectively indicated by the abscissa, the ordinate, and bar graphs in FIG. 12 are substantially the same as the contents shown in FIG. 6.

By comparing FIG. 12 and FIG. 6, it is seen that the processing apparatus 100 in this modification can calculate a probability having tendency substantially the same as the tendency of the target training data. It is also seen that a change in the fraction of the selection probabilities of the product A and the product B in the initial state according to the feature value of choices presented to the consumer can be reproduced. Consequently, it can be confirmed that the processing apparatus 100 can represent consumption behavior of the consumer cognitively biased by the similarity effect, the compromise effect, the attraction effect, and the like using the selection model 10 and can learn the selection model 10 using the known learning algorithm.

As explained above, the processing apparatus 100 in this modification can estimate cognitively biased consumption behavior of the consumer on the basis of the learned model. Therefore, the processing apparatus 100 can also estimate a combination of input choices for improving a selection probability of an output choice decided in advance. In this case, the acquiring unit 110 acquires a combination of input feature vectors corresponding to a plurality of combinations of input choices including a choice desired to be selected by the consumer. The selecting unit 160 set, as an output choice set in advance, a choice selected by the consumer. Note that the choice desired to be selected by the consumer and the plurality of combinations of the input choices may be input or designated from the user or the like.

The estimating unit 170 estimates, while changing the combination of the plurality of input feature vectors acquired by the acquiring unit 110, possibility of an output choice decided in advance in the selection model being selected. The estimating unit 170 sequentially calculates probabilities of the choice decided in advance being selected and outputs a combination of input feature vectors corresponding to a highest probability in a calculation result as a combination of a plurality of input feature vectors for maximizing the possibility of the output choice decided in advance being selected. Consequently, for example, the processing apparatus 100 in this modification can predict an input choice for further increasing a probability of a choice corresponding to a product or a service promoted for sales being selected.

In the processing apparatus 100 in this modification explained above, the acquiring unit 110 may acquire training data including a choice selected by the user out of choices presented on a web site. That is, in this example, a target is the user and choices are presented to the user on the web site. Consequently, the processing apparatus 100 can model, for example, selection behavior of a consumer who performs shopping via the Internet. The processing apparatus 100 can learn purchase behavior of the consumer and present an appropriate choice including a product or the like promoted for sale to the consumer via the web site.

The processing apparatus 100 in this embodiment can calculate, according to a choice and the feature value of choices presented to the consumer, probabilities that respective products included in the choice are selected. Therefore, the processing apparatus 100 can also calculate, according to a menu presented to the consumer by an eating place such as a cafeteria or a restaurant, probabilities that menu items included in the menu are selected. Consequently, the processing apparatus 100 can predict the numbers, the materials, and the like of menu items that should be prepared according to a menu presented by the eating place or the like.

In the above explanation of the processing apparatus 100 in this embodiment, the learning processing unit 150 generates and learns one selection model 10. Instead, the learning processing unit 150 may generate and separately and independently learn each of a plurality of the selection models 10. The learning processing unit 150 generates the plurality of selection models 10 in association with a plurality of consumer groups and learns the selection model 10 for each of the consumer groups. The consumer group is a group including one or more consumers. Consequently, it is possible to more finely analyze, for each of consumers, selection behavior of the consumer.

FIG. 13 shows a configuration example of an estimating apparatus 200 according to this embodiment. The estimating apparatus 200 estimates, using a selection model obtained by modeling selection behavior of a selection entity that selects at least one choice out of presented input choices, selection behavior of the selection entity. That is, the estimating apparatus 200 estimates selection behavior of the selection entity using a learning result of a learning model learned by the processing apparatus 100 according to this embodiment shown in FIG. 4. In the estimating apparatus 200 according to this embodiment, components that perform operations substantially the same as the operations of the components of the processing apparatus 100 according to this embodiment shown in FIG. 11 are denoted by the same reference numerals and explanation of the components is omitted.

The acquiring unit 110 of the estimating apparatus 200 is connected to a network or the like, acquires a selection model used for learning by the processing apparatus 100 and parameters decided by learning, and stores the selection model and the parameters in the storing unit 120. The acquiring unit 110 acquires a plurality of input feature vectors that indicate features of a plurality of input choices presented to the selection entity.

The estimating apparatus 200 estimates selection behavior of the selection entity using the acquired plurality of input feature vectors, the acquired selection model, and a parameter vector θ. Note that the operation of the estimating apparatus 200 for estimating selection behavior of the selection entity is substantially the same as the operation explained in the operation of the modification of the processing apparatus 100 according to this embodiment shown in FIG. 11. Therefore, explanation of the operation is omitted. According to the combination of the processing apparatus 100 and the estimating apparatus 200 according to this embodiment explained above, it is possible to execute learning and estimation of selection behavior of the selection entity.

In the above explanation, the processing apparatus 100 according to this embodiment executes learning and estimation of selection behavior of the selection entity using the selection model 10 shown in FIG. 10. However, a selection model is not limited to the selection model 10. As shown in FIG. 14 to FIG. 17, the processing apparatus 100 may execute learning and estimation of selection behavior of the selection entity using various selection models.

FIG. 14 shows a first modification of the selection model 10 according to this embodiment. In the selection model 10 according to this embodiment, components that perform operations the same as the operations of the components of the selection model 10 according to this embodiment shown in FIG. 10 are denoted by the same reference numerals and explanation of the components is omitted. The selection model 10 includes D input layers 12 and C output layers 14. First weight values $W_{di1}$ are set between input nodes $x_{di}$ and intermediate nodes $h_1$. The first weight values $W_{di1}$ are equal to $W_{i1}/D$. That is, the D input layers 12 as a whole supply a value obtained by averaging input feature values corresponding to the same nodes in the layers to the intermediate layer 16.

Therefore, the D input layers 12 are equivalent to the one input layer 12 of the selection model 10 shown in FIG. 10 in the case in which the input combining unit 130 sets an average of a plurality of input feature vectors as an input combined vector. Similarly, the C output layers 14 are equivalent to the one output layer 14 of the selection model 10 shown in FIG. 10 in the case in which the output combining unit 140 sets an average of a plurality of output feature vectors as an output combined vector. That is, in the processing apparatus 100, when the selection model 10 of the first modification shown in FIG. 14 is used, the input combining unit 130 and the output combining unit 140 do not have to be provided.

FIG. 15 shows a second modification of the selection model 10 according to this embodiment. In the selection model 10 according to this embodiment, components that perform operations the same as the operations of the components of the selection model 10 according to this embodiment shown in FIG. 10 are denoted by the same reference numerals and explanation of the components is omitted. In the selection model 10 in the second modification, weight values $V_{ij1}$ are set among input nodes $x_i$, intermediate nodes $h_1$, and output nodes $y_j$. The input nodes $x_i$, the intermediate nodes $h_1$, and the output nodes $y_j$ are connected to one another. The weights are $V_{ij1}$ respectively added to flows of data by the connection. Even if such a selection model 10 is used, the processing apparatus 100 can execute learning and estimation of selection behavior of the selection entity in substantially the same manner as the selection model 10 shown in FIG. 10 by using an energy function indicated by the following expression.

$$E(x, y, h; \theta) =$$ Expression 10

$$-\sum_{i=1}^{K}\sum_{j=1}^{K}\sum_{l=1}^{L} V_{ijl} x_i y_j h_l - \sum_{i=1}^{K} b_i^x x_i - \sum_{j=1}^{K} b_j^y y_j - \sum_{l=1}^{L} b_l^h h_l$$

FIG. 16 shows a third modification of the selection model 10 according to this embodiment. In the selection model 10 according to this embodiment, components that perform operations the same as the operations of the components of the selection model 10 according to this embodiment shown in FIG. 10 are denoted by the same reference numerals and explanation of the components is omitted. In the selection model 10 in the third modification, weight values $U_{gx}$, $U_{gh}$, and $U_{gy}$ are set among the input nodes $x_i$, the intermediate nodes $h_1$, and the output nodes $y_j$. The input nodes $x_i$, the intermediate nodes $h_1$, and the output nodes $y_j$ are connected to one another. The weight values $U_{gx}$, $U_{gh}$, and $U_{gy}$ are respectively added to flows of data by the connection. Even if such a selection model 10 is used, the processing apparatus 100 can execute learning and estimation of selection behavior of the selection entity in substantially the same manner as the selection model 10 shown in FIG. 10 by using an energy function indicated by the following expression.

$$E(x, y, h; \theta_U) = -y^T U(x) h - x^T b_x - y^T b_y - h^T b_h \quad \text{Expression 11}$$

$$U(x) = U_{yg} \text{diag}(U_{gx} x) U_{gh}$$

$$F(x, y; \theta_U) = -y^T U(x) \hat{h_U} - x^T b_x - y^T b_y - h_U^T b_h [\hat{h_U}]_l \equiv$$

$$p(h_l = 1 \mid x, y; \theta_U) =$$

$$\sigma\left(b_l + \sum_{r=1}^{G} U_{rl}^{gh} \sum_{i=1}^{K} U_{ri}^{gx} x_i \sum_{j=1}^{K} y_j U_{jr}^{yg}\right) l \in [1, L]$$

FIG. 17 shows a fourth modification of the selection model 10 according to this embodiment. In the selection model 10 according to this embodiment, components that perform operations the same as the operations of the components of the selection model 10 according to this embodiment shown in FIG. 10 are denoted by the same reference numerals and explanation of the components is omitted. In the selection model 10 in the fourth modification, weight values $W_{xg}$, $W_{gh}$, and $W_{gy}$ are set among the input nodes $x_i$, the intermediate nodes $h_1$, and the output nodes $y_j$. The input nodes $x_i$, the intermediate nodes $h_1$, and the output nodes $y_j$ are connected to one another. The weight values $W_{xg}$, $W_{gh}$, and $W_{gy}$ are respectively added to flows of data by the connection. Even if such a selection model 10 is used, the processing apparatus 100 can execute learning and estimation of selection behavior of the selection entity in substantially the same manner as the selection model 10 shown in FIG. 10 by using an energy function indicated by the following expression.

$$E(x, y, h; \theta_W) = -x^T W(y) h - x^T b_x - y^T b_y - h^T b_h \quad \text{Expression 12}$$

$$W(y) = W_{xg} \text{diag}(W_{gy} y) W_{gh}$$

$$F(x, y; \theta_W) = -x^T W(y) \hat{h_W} - x^T b_x - y^T b_y - h_W^T b_h [\hat{h_W}]_l \equiv$$

$$p(h_l = 1 \mid x, y; \theta_W) =$$

-continued $$\sigma\left(b_l + \sum_{r=1}^{G} W_{rl}^{gh} \sum_{i=1}^{K} x_i W_{ir}^{xg} \sum_{j=1}^{K} W_{rj}^{gy} y_j\right) l \in [1, L]$$

FIG. 18 illustrates an example of a hardware configuration of a computer 1900 functioning as the processing apparatus 100 and the estimating apparatus 200 according to this embodiment. The computer 1900 according to this embodiment includes a CPU peripheral unit including a CPU 2000, a RAM 2020, a graphic controller 2075, and a display device 2080 connected to one another by a host controller 2082, an input-output unit including a communication interface 2030, a hard disk drive 2040, and a DVD drive 2060 connected to the host controller 2082 by the input-output controller 2084, and a legacy input-output unit including a ROM 2010, a flexible disk drive 2050, and an input-output chip 2070 connected to the input-output controller 2084.

The host controller 2082 connects the RAM 2020 and the CPU 2000 and the graphic controller 2075 that access the RAM 2020 at a high transfer rate. The CPU 2000 operates and performs control of the units on the basis of programs stored in the ROM 2010 and the RAM 2020. The graphic controller 2075 acquires image data generated by the CPU 2000 or the like on a frame buffer provided in the RAM 2020 and causes the display device 2080 to display the image data. Instead, the graphic controller 2075 may include, on the inside, a frame buffer that stores the image data generated by the CPU 2000 or the like.

The input-output controller 2084 connects the host controller 2082, the communication interface 2030, which is a relatively high-speed input-output device, the hard disk drive 2040, and the DVD drive 2060. The communication interface 2030 communicates with other apparatuses via a network. The hard disk drive 2040 stores a program and data used by the CPU 2000 in the computer 1900. The DVD drive 2060 reads a program or data from a DVD-ROM 2095 and provides the hard disk drive 2040 with the program or the data via the RAM 2020.

The ROM 2010 and a relatively low-speed input-output device for the flexible disk drive 2050 and the input-output chip 2070 are connected to the input-output controller 2084. The ROM 2010 stores, for example, a boot program executed by the computer 1900 during startup and/or a program that depends on hardware of the computer 1900. The flexible disk drive 2050 reads a program or data from a flexible disk 2090 and provides the hard disk drive 2040 with the program or the data via the RAM 2020. The input-output chip 2070 connects the flexible disk drive 2050 to the input-output controller 2084 and connects various input-output devices to the input-output controller 2084 via, for example, a parallel port, a serial port, a keyboard port, or a mouse port.

The program provided to the hard disk drive 2040 via the RAM 2020 is stored in the flexible disk 2090, the DVD-ROM 2095, or a recording medium such as an IC card and provided by a user. The program is read out from the recording medium, installed in the hard disk drive 2040 in the computer 1900 via the RAM 2020, and executed in the CPU 2000.

The program is installed in the computer 1900 and causes the computer 1900 to function as the acquiring unit 110, the storing unit 120, the input combining unit 130, the output combining unit 140, the learning processing unit 150, the selecting unit 160, the estimating unit 170, and the like.

Information processing described in the program is read by the computer 1900 to thereby function as the acquiring unit 110, the storing unit 120, the input combining unit 130, the output combining unit 140, the learning processing unit 150, the selecting unit 160, and the estimating unit 170, and the like, which are specific means obtained by software and the various hardware resources explained above cooperating with each other. An operation or processing of information corresponding to a purpose of use of the computer 1900 in this embodiment is realized by the specific means, whereby a peculiar processing apparatus 100 and estimating apparatus 200 corresponding to the purpose of use are built.

As an example, when communication is performed between the computer 1900 and an external apparatus or the like, the CPU 2000 executes a communication program loaded on the RAM 2020 and instructs, on the basis of processing contents described in the communication program, the communication interface 2030 to perform communication processing. The communication interface 2030 is controlled by the CPU 2000 and reads out transmission data stored in a transmission buffer regions or the like provided on a storage device such as the RAM 2020, the hard disk drive 2040, the flexible disk 2090, or the DVD-ROM 2095 and transmits the transmission data to the network or writes reception data received from the network in a reception buffer region or the like provided on the storage device. In this way, the communication interface 2030 may transfer the transmission and reception data between the communication interface 2030 and the storage device according to a DMA (direct memory access) system. Instead, the CPU 2000 may read out data from the storage device or the communication interface 2030 at a transfer source and write the data in the communication interface 2030 or the storage device at a transfer destination to thereby transfer the transmission and reception data.

The CPU 2000 reads all parts or a necessary part out of a file, a database, or the like stored in an external storage device such as the hard disk drive 2040, the DVD drive 2060 (the DVD-ROM 2095), or the flexible disk drive 2050 (the flexible disk 2090) into the RAM 2020 according to DMA transfer or the like and applies various kinds of processing to data on the RAM 2020. The CPU 2000 writes back the data subjected to the processing to the external storage device according to the DMA transfer or the like. In such processing, the RAM 2020 can be regarded as temporarily retaining contents of the external storage device. Therefore, in this embodiment, the RAM 2020, the external storage device, and the like are generally referred to as memory, storing unit, storage device, or the like. Various kinds of information concerning various programs, data, tables, databases, and the like in this embodiment are stored on such a storage device and subjected to information processing. The CPU 2000 can retain a part of the RAM 2020 in a cache memory and perform reading and writing on the cache memory. In such a form, the cache memory performs a part of the function of the RAM 2020. Therefore, except when being distinguished, the cache memory is also included in the RAM 2020, the memory, and/or the storage device.

The CPU 2000 applies various kinds of processing including the various kinds of operations, processing of information, condition determination, and search and replacement of information described in this embodiment designated by a command sequence of the program to the data read out from the RAM 2020 and writes back the data to the RAM 2020. For example, in performing the condition determination, the CPU 2000 determines whether the various variables described in this embodiment satisfy a condition that the variables are, for example, larger than, smaller than, equal to or larger than, equal to or smaller than, or equal to other variables or constants and, when the condition is satisfied (or not satisfied), branches to a different command sequence or invokes a sub-routine.

The CPU 2000 can search for information stored in a file, a database, or the like in the storage device. For example, when a plurality of entries, in which attribute values of a second attribute are respectively associated with attribute values of a first attribute, are stored in the storage device, the CPU 2000 can obtain the attribute value of the second attribute associated with the first attribute satisfying a predetermined condition by searching for an entry, in which the attribute value of the first attribute coincides with a designated condition, out of the plurality of entries stored in the storage device and reading out the attribute value of the second attribute stored in the entry.

The program or the module explained above may be stored in an external recording medium. As the recording medium, besides the flexible disk 2090 and the DVD-ROM 2095, an optical recording medium such as a DVD, a Blu-ray (registered trademark), or a CD, a magneto-optical recording medium such as an MO, a tape medium, a semiconductor memory such as an IC card, and the like can be used. A storage device such as a hard disk or a RAM provided in a server system connected to a dedicated communication network or the Internet may be used as a recording medium to provide the program to the computer 1900 via the network.

The present invention is explained above with reference to the embodiment. However, the technical scope of the present invention is not limited to the scope described in the embodiment. It is evident for those skilled in the art that various changes or improvements can be added to the embodiment. It is evident from the description of the scope of claims that forms added with such changes or improvements could be included in the technical scope of the present invention.

It should be noted that the execution order of the processing such as the operations, the procedures, the steps, and the stages in the apparatus, the system, the program, and the method explained in the claims, the specification, and the drawings could be realized in any order unless the execution order is clearly indicated as "before", "prior to", or the like in particular and an output of preceding processing is used in later processing. Even if an operation flow in the claims, the specification, and the drawings is described using "first", "subsequently", and the like for convenience, this does not mean that it is essential to carry out the operation flow in the described order.

REFERENCE SIGNS LIST

10 . . . Selection model
12 . . . Input layer
14 . . . Output layer
16 . . . Intermediate layer
100 . . . Processing apparatus
110 . . . Acquiring unit
112 . . . Binarizing unit
114 . . . Selecting unit
120 . . . Storing unit
130 . . . Input combining unit
140 . . . Output combining unit
150 . . . Learning processing unit
160 . . . Selecting unit
170 . . . Estimating unit 200 . . . Estimating apparatus
1900 . . . Computer
2000 . . . CPU
2010 . . . ROM
2020 . . . RAM
2030 . . . Communication interface
2040 . . . Hard disk drive
2050 . . . Flexible disk drive
2060 . . . DVD drive
2070 . . . Input-output chip
2075 . . . Graphic controller
2080 . . . Display device
2082 . . . Host controller
2084 . . . Input-output controller
2090 . . . Flexible disk
2095 . . . DVD-ROM

What is claimed is:

1. An information processing system comprising:
memory;
a processor communicatively coupled to the memory; and
a processing apparatus communicatively coupled to the memory and the processor, the processing apparatus comprising:
an acquiring unit configured to acquire training data including
a plurality of input feature vectors that each indicate an input choice and one or more features of the input choice, wherein the input choice is one of a plurality of input choices presented to a selection entity in a choice set from a plurality of choice sets, and
a plurality of output feature vectors each indicating at least one output choice and one or more features of the at least one output choice, wherein each of the at least one output choice is an input choice selected by the selection entity from one choice set of the plurality of choice sets;
an input combining unit configured to combine the plurality of input feature vectors to generate an input combined vector;
a learning processing unit configured to learn a selection model based on the input combined vector and the plurality of output feature vectors, wherein the selection model models how a fraction of selection rates of choices included in input choices change based on a combination of other choices included in the input choices and one or more feature values of the input choices; and
an estimating unit programmed with the selection model and configured to determine one or more input choices from the plurality of input choices likely to be selected by the selection entity.

2. The information processing system according to claim 1, wherein the processing apparatus further comprises:
an output combining unit configured to combine the plurality of the output feature vectors to generate an output combined vector, wherein
the learning processing unit learns the selection model on the basis of the input combined vector and the output combined vector.

3. The information processing system according to claim 2, wherein the selection model comprises a plurality of input nodes corresponding to a plurality of input feature values included in the input combined vector, a plurality of output nodes corresponding to a plurality of output feature values included in the output combined vector, and a plurality of intermediate nodes, and
the learning processing unit learns a plurality of weight parameters provided between the plurality of input nodes and the plurality of intermediate nodes and between the plurality of output nodes and the plurality of intermediate nodes.

4. The information processing system according to claim 2, wherein each of the plurality of input feature vectors and the plurality of output feature vectors is a binary vector.

5. The information processing system according to claim 4, wherein the acquiring unit comprises a binarizing unit configured to binarize feature parameters of choices of each of the plurality of input choices and each of the output choices and generate a feature vector of each of the plurality of input feature vectors and each of the plurality of output feature vectors.

6. The information processing system according to claim 5, wherein the binarizing unit converts feature parameters closer to each other into feature vectors closer to each other.

7. The information processing system according to claim 2, wherein the input combining unit generates, for the plurality of input choices, the input combined vector that takes the same value without depending on order of the input choices, and
the output combining unit generates, for the output choices, the output combined vector that takes the same value without depending on order of the output choices.

8. The information processing system according to claim 7, wherein the input combining unit and the output combining unit generate the input combined vector and the output combined vector based on an average of the plurality of input feature vectors and an average of the plurality of output feature vectors.

9. The information processing system according to claim 7, wherein the acquiring unit acquires the plurality of input feature vectors and the plurality of output feature vectors, which are binary vectors, and
the input combining unit and the output combining unit generate the input combined vector and the output combined vector based on a logical operation of the plurality of input feature vectors and a logical operation of the plurality of output feature vectors.

10. The information processing system according to claim 9, wherein the input combining unit and the output combining unit generate the input combined vector and the output combined vector based on logical OR of each of elements of the plurality of input feature vectors and logical OR of each of elements of the plurality of output feature vectors.

11. The information processing system according to claim 1, wherein in response to selection behavior of the selection entity being predicted, the acquiring unit acquires the plurality of input feature vectors corresponding to the plurality of input choices presented to the selection entity,
the input combining unit combines the plurality of input feature vectors to generate the input combined vector, and
the processing apparatus comprises:
a selecting unit configured to select, out of the plurality of input feature vectors corresponding to the plurality of input choices, an output feature vector of at least one of the output choices, which is a choice, possibility of which being selected by the selection entity is estimated; and
the estimating unit configured to estimate, on the basis of the input combined vector and the output feature vector that has been selected, possibility of the the at least one of the output choices being selected in the selection model.

12. A method for generating a selection model obtained by modeling selection behavior of a selection entity that selects at least one choice out of presented input choices, the method comprising:
- acquiring training data comprising
  - a plurality of input feature vectors that each indicate an input choice and one or more features of the input choice, wherein the input choice is one of a plurality of input choices presented to a selection entity in a choice set from a plurality of choice sets, and
  - a plurality of output feature vectors each indicating at least one output choice and one or more features of the at least one output choice, wherein each of the at least one output choice is an input choice selected by the selection entity from one choice set of the plurality of choice sets;
- combining the plurality of input feature vectors to generate an input combined vector;
- learning the selection model based on the input combined vector and the plurality of output feature vectors, wherein the selection model models how a fraction of selection rates of choices included in input choices change based on a combination of other choices included in the input choices and one or more feature values of the input choices; and
- determining, utilizing the selection model, one or more input choices from the plurality of input choices likely to be selected by the selection entity.

13. The method according to claim 12, further comprising:
- combining the plurality of the output feature vectors to generate an output combined vector, wherein the selection model is learned on the basis of the input combined vector and the output combined vector.

14. The method according to claim 13, wherein the selection model comprises a plurality of input nodes corresponding to a plurality of input feature values included in the input combined vector, a plurality of output feature values included in the output combined vector, and a plurality of intermediate nodes, and
wherein the learning further comprises learning a plurality of weight parameters provided between the plurality of input nodes and the plurality of intermediate nodes and between the plurality of output nodes and the plurality of intermediate nodes.

15. The method according to claim 13, wherein each of the plurality of input feature vectors and the plurality of output feature vectors is a binary vector.

16. The method according to claim 15, further comprising:
- binarizing feature parameters of choices of each of the plurality of input choices and each of the output choices and generate a feature vector of each of the plurality of input feature vectors and each of the plurality of output feature vectors.

17. A computer program product for generating a selection model obtained by modeling selection behavior of a selection entity that selects at least one choice out of presented input choices, the computer program product comprising:
- a non-transitory storage medium readable by a processing circuit and storing instructions for execution by the processing circuit for performing a method comprising:
  - acquiring training data comprising
    - a plurality of input feature vectors that each indicate an input choice and one or more features of the input choice, wherein the input choice is one of a plurality of input choices presented to a selection entity in a choice set from a plurality of choice sets, and
    - a plurality of output feature vectors each indicating at least one output choice and one or more features of the at least one output choice, wherein each of the at least one output choice is an input choice selected by the selection entity from one choice set of the plurality of choice sets;
  - combining the plurality of input feature vectors to generate an input combined vector;
    - learning the selection model based on the input combined vector and the plurality of output feature vectors, wherein the selection model models how a fraction of selection rates of choices included in input choices change based on a combination of other choices included in the input choices and one or more feature values of the input choices; and
    - determining, utilizing the selection model, one or more input choices from the plurality of input choices likely to be selected by the selection entity.

18. The computer program product according to claim 17, wherein the method further comprises:
- combining the plurality of the output feature vectors to generate an output combined vector, wherein the learning processing unit learns the selection model on the basis of the input combined vector and the output combined vector.

19. The computer program product according to claim 18, wherein the selection model comprises a plurality of input nodes corresponding to a plurality of input feature values included in the input combined vector, a plurality of output nodes corresponding to a plurality of output feature values included in the output combined vector, and a plurality of intermediate nodes, and
wherein the learning further comprises learning a plurality of weight parameters provided between the plurality of input nodes and the plurality of intermediate nodes and between the plurality of output nodes and the plurality of intermediate nodes.

20. The computer program product according to claim 18, wherein each of the plurality of input feature vectors and the plurality of output feature vectors is a binary vector.

* * * * *